(12) United States Patent
Clodore et al.

(10) Patent No.: US 11,076,047 B1
(45) Date of Patent: Jul. 27, 2021

(54) INTENT ANALYSIS FOR CALL CENTER RESPONSE GENERATION

(71) Applicant: LIVEPERSON, INC., New York, NY (US)

(72) Inventors: Glen Clodore, Whickham (GB); Matthew Smith, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/183,567

(22) Filed: Feb. 24, 2021

Related U.S. Application Data

(60) Provisional application No. 62/981,466, filed on Feb. 25, 2020.

(51) Int. Cl.
*H04M 3/51* (2006.01)
*H04M 3/42* (2006.01)

(52) U.S. Cl.
CPC ..... *H04M 3/5175* (2013.01); *H04M 3/42221* (2013.01); *H04M 2203/401* (2013.01); *H04M 2203/403* (2013.01)

(58) Field of Classification Search
CPC .......... H04M 3/5175; H04M 3/42221; H04M 2203/403; H04M 2203/401
USPC ............ 379/265.07, 265.06, 265.01, 265.05, 379/265.11, 266.1, 265.08, 265.12, 379/266.08
See application file for complete search history.

(56) References Cited

U.S. PATENT DOCUMENTS

| | | | |
|---|---|---|---|
| 2015/0379562 A1* | 12/2015 | Spievak | H04M 3/5158 379/265.09 |
| 2018/0077088 A1 | 3/2018 | Cabrera-Cordon et al. | |
| 2019/0265865 A1* | 8/2019 | Yaseen | G06F 3/04842 |

OTHER PUBLICATIONS

Lam et al., "Optimizing Customer-Agent Interactions with Natural Language Processing and Machine Learning" 2019 Systems and Engineering Design Symposium (SIEDS), IEEE, Apr. 26, 2019; 6 pages.
International Search Report and Written Opinion for PCT Application No. PCT/US2021/019327 dated May 26, 2021, 10 pages.

* cited by examiner

*Primary Examiner* — Thjuan K Addy
(74) *Attorney, Agent, or Firm* — Polsinelli LLP

(57) ABSTRACT

A system obtains conversation data corresponding to conversations between users and agents of a client. The system identifies a set of intents from the conversations and identifies a set of contexts, explicit elements, and implied elements of these intents. The system identifies actions that can be performed to recognize new explicit and implied elements from new conversations and to address intents in these new conversations. Based on these actions, the system generates a set of recommendations that can be provided to the client. As agents communicate with users, the system monitors adherence to the set of recommendations.

24 Claims, 16 Drawing Sheets

INTENT ANALYSIS FOR CALL CENTER RESPONSE GENERATION

CROSS-REFERENCE TO RELATED APPLICATIONS

This application claims the benefit of U.S. Provisional Patent Application No. 62/981,466, entitled "Intent Analysis For Call Center Response Generation," filed Feb. 25, 2020, which is hereby incorporated by reference in its entirety.

FIELD

The present disclosure relates generally to communication processing using structured frameworks to deliver favorable conversational responses. More specifically, techniques are provided to deploy a framework to assist virtual and/or human agents to provide conversational responses to customers based on the intent communicated by these customers.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
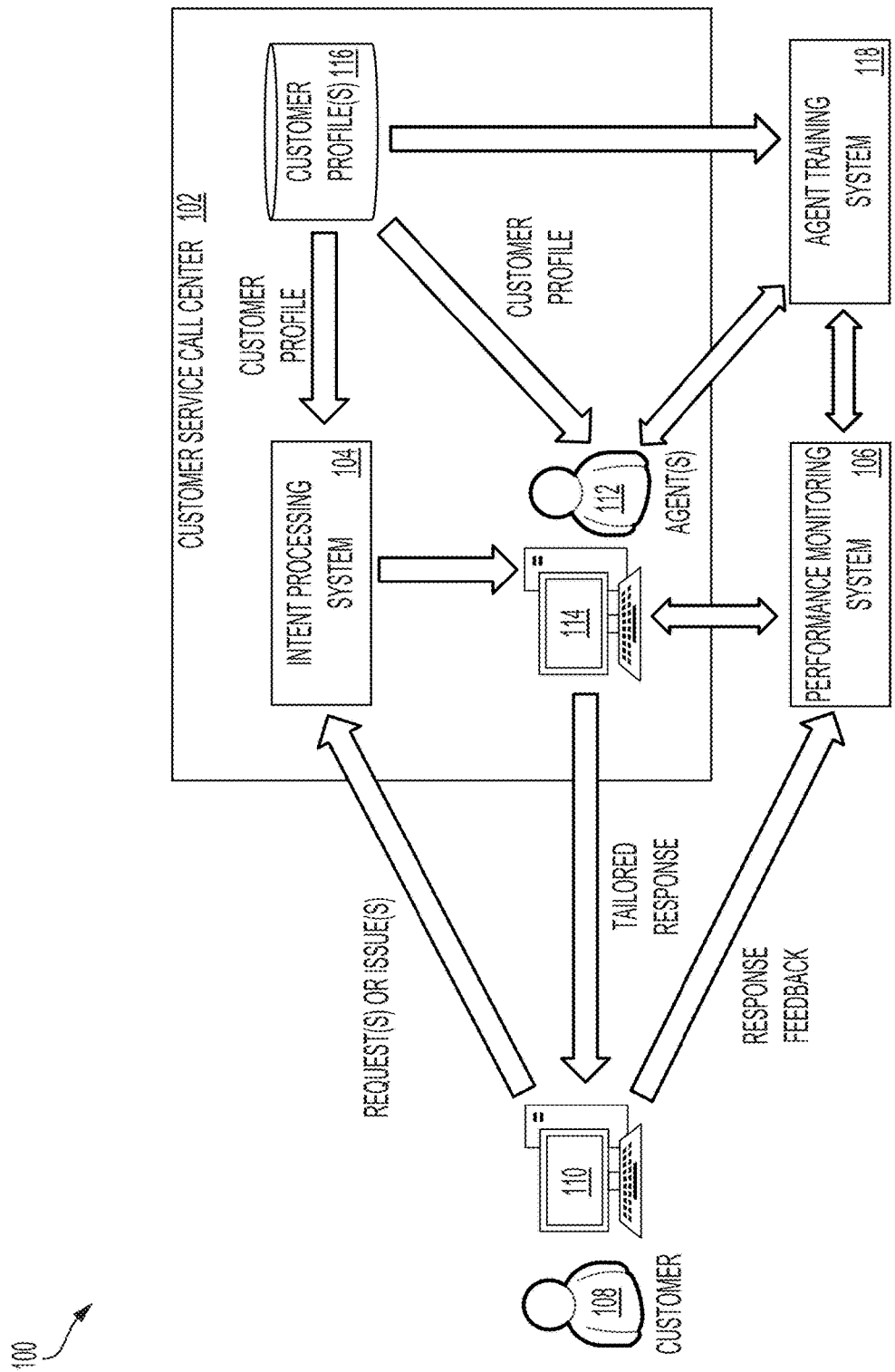
FIG. 1 shows an illustrative example of an environment in which an intent from a customer is evaluated in order to determine a solution to the intent and generate a response that can be provided by an agent in accordance with at least one embodiment.

FIG. 1 shows an illustrative example of an environment 100 in which an intent from a customer 108 is evaluated in order to determine a solution to the intent and generate a response that can be provided by an agent 112 in accordance with at least one embodiment. Certain embodiments relate to establishing connections between a network device 110 (which can be operated by a customer 108) and a terminal device 114 (which can be operated by an agent 112) to enable the customer 108 and agent 112 to engage in a communications session, such as a customer service messaging session. The network device 110 may include a mobile device (e.g., smartphone, tablet computer, etc.), a computing device (e.g., laptop, personal computer, server, etc.), and the like.

In some embodiments, the customer 108 can be an individual accessing a customer service call center 102 in order to submit an issue or request that can be resolved or otherwise processed by an agent 112 of the customer service call center 102. For instance, the customer 108 can be an individual looking to have a service performed on their behalf. Such a service can include having a question answered, getting help from an agent 112 with a task or service, conducting a transaction, etc.

The customer service call center 102 can be an entity that provides, operates, or runs an online service for providing assistance to customers of a client or other organization that provides services and/or goods to its customers, such as customer 108. For instance, the customer service call center 102 may provide customer support on behalf of the client or other organization. In some embodiments, the customer service call center 102 is provided by the client or other organization to process requests and/or issues submitted by the client's customers.

The customer service call center 102 may employ one or more agents 112. An agent 112 can be an individual, such as a support agent or sales associate tasked with providing support or information to the customer 108 regarding an online service (e.g., information about products available at an online store) and/or to address any issues or requests submitted by a customer 108 (e.g., requests for refunds, troubleshooting requests, etc.). The agent 112 may be affiliated or not affiliated with the client. Each agent can be associated with one or more clients. In some non-limiting examples, a customer 108 can be an individual shopping an online store from a personal computing device 110, a client can be a company that sells products online, and an agent 112 can be a sales associate employed by the company. In various embodiments, the customer 108, client, and agent 112 can be other individuals or entities.

In an embodiment, the customer service call center 102 implements an intent processing system 104 that is configured to process incoming intents from a customer 108. The intent processing system 104 may assess the (e.g., extracted or received) message from a customer 108 to the customer service call center 102 to engage with an agent 112 to resolve a request or issue. Examples of intents can include (for example) topic, sentiment, complexity, and urgency. A topic can include, but is not limited to, a subject, a product, a service, a technical issue, a use question, a complaint, a refund request or a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In an embodiment, the intent processing system 104 analyzes the incoming message from the customer 108 to determine the context that the request or issue is shared in. Further, the intent processing system 104 determines what the level of urgency is, how stressed the customer 108 is, whether there are any time constraints in processing the request or issue, and the like. For example, if the message includes a request to address an issue related to a customer's television and the customer 108 has indicated that a big game that the customer 108 wishes to watch is about to start, the intent processing system 104 may determine that there is a time constraint in addressing this issue and that the customer 108 may be exhibiting a level of stress or anxiety.

In an embodiment, the intent processing system 104, in response to obtaining a new message or customer utterance, obtains a customer profile from a customer profile repository 116. The customer profile repository 116 may be maintained by the customer service call center 102 or maintained remotely by a client. The customer profile may include historical information and other data about the customer 108 including, but not limited to, past interactions between the customer 108 and agents of the customer service call center 102 to address other requests or issues that the customer 108 may have had. The customer profile may be used by the intent processing system 104 to better determine the characteristics of the obtained message from the customer 108.

In an embodiment, the intent processing system 104 provides the intent to the agent 112, as well as other information that can be used by the agent 112 to construct a response to the intent or customer utterance. In some instances, the intent processing system 104 may provide, to the agent 112, a baseline response that incorporates elements that may produce a positive response from the customer 108. For instance, the intent processing system 104 may indicate that the response from the agent 112 is to include a particular foundation (e.g., message to be conveyed), an ending (e.g., the result of the message, such as a timeline for a resolution to the issue/request, etc.), and/or other positive elements that provide flavor to the response that may be appealing to the customer 108 or that otherwise may assuage the customer's concerns and reduce the customer's stress levels. The information provided by the intent processing system 104 may guide the agent 112 in preparing a response that is tailored to the customer's known or perceived preferences while addressing the received intent.

In an embodiment, as the agent 112 engages with the customer 108, the customer 108 can provide additional utterances or responses via the communications session established between the customer 108 and agent 112. These additional utterances may be processed by the intent processing system 104 to further generate recommendations and parameters for responses to these utterances. Thus, during the communications session, the intent processing system 104 may evaluate new utterances and, based on an analysis of the customer profile, the context in which the new utterances were made, the original intent submitted by the customer 108, and other features of the conversation, determine how the agent 112 should respond to the customer 108. In some embodiments, the intent processing system 104 includes a machine learning model or artificial intelligence (AI) that may be used to process the intent and other customer utterances as input, along with the customer profile, to generate a response. This response may be provided to the agent 112, who may provide this tailored response to the customer 108.

In an embodiment, the agent 112 is trained using a framework designed to assist virtual and/or human agents to deliver a positive conversational experience to customers of the customer service call center 102. For instance, the customer service call center 102 may include an agent training system 118 that defines a sequence of actions that are performed to accurately capture critical elements expressed by customers of the customer service call center 102 in conversations with agents and to identify how best to respond to customers adequately. The agent training system 118 may be implemented using a computing device associated with the customer service call center 102 (e.g., provided by the customer service call center 102, provided by a third-party service associated with the customer service call center 102, etc.). The agent training system 118 may be configured to address situational and emotional elements (whether explicit or implied) to enable agents to fulfill customer intents and expectations while maintaining fluid and natural conversations.

The agent training system 118 may operate under an "analyze, identify, respond" framework, through which the agent training system 118 may identify any improvements that may be made by an agent 112 to better respond to customers of the customer service call center 102. For instance, in an embodiment, the agent training system 118 processes historical data corresponding to previous interactions between the agent 112 and customers of the customer service call center 102. This historical data may be obtained from a Customer Relationship Management (CRM) system (not shown) maintained by the customer service call center 102 or from a historical conversation datastore maintained by the agent training system 118. The agent training system 118 may process historical conversation data corresponding to conversations between the agent 112 and customers of the customer service call center 102, as well as corresponding customer profiles of the customers from the customer profile repository 116, to identify explicit and implied elements in customer responses and to contextualize these responses.

In an embodiment, the agent training system 118 uses a machine learning algorithm or artificial intelligence to identify actions that may be taken by the agent 112 to improve their ability to recognize explicit and implied elements in customer responses and to contextualize these elements to determine what they may pertain to (e.g., the associated intent, etc.). The machine learning algorithm or artificial intelligence may be trained using supervised training techniques. For instance, the machine learning algorithm or artificial intelligence may be trained using sample conversations and corresponding feedback provided with regard to recommendations generated by the machine learning algorithm or artificial intelligence based on the sample conversations for identifying explicit and implied elements and for contextualizing these elements. As an illustrative example, an evaluator of the machine learning algorithm or artificial intelligence (e.g., an administrator of the agent training system 118, agents of the customer service call center 102, independent party introduced to perform such evaluations, etc.) may review the provided recommendations and determine whether the recommendations are conducive to improving agent responses to customers. In some instances, an evaluator may act as a customer, which may transmit new messages to a sample agent to determine whether the sample agent's performance with regard to responding to these messages has improved as a result of the provided recommendations. For example, the evaluator may determine whether the agent, based on the provided recommendation, was able to quickly identify the evaluator's intent and provide a response that was favorable to the evaluator in addressing the intent in a positive manner. Based on this feedback, the machine learning algorithm or artificial intelligence may be re-trained to provide more accurate or improved recommendations to agents based on historical conversation data available for the agents.

In an embodiment, the output of the machine learning algorithm or artificial intelligence provides conditional logic that may be used by agents as they identify what the detected implicit and explicit elements of a customer's message pertains to. This conditional logic may introduce different elements for addressing the intent identified based on the detected implicit and explicit elements of a customer's message. For instance, the conditional logic may include a component that serves to address the customer's intent (e.g., what the customer may be requesting or wanting when they started messaging the customer service call center 102) and a component that constitutes another section corresponding to a probable next question or action that is to be taken by a customer. In addition to these elements, the machine learning algorithm or artificial intelligence may provide recommendations for reacting appropriately to positive or negative emotional elements in a conversation such as frustration, disappointment, stress, pleasure, happiness, contentment, etc.

In addition to providing recommendations for identifying implicit and explicit elements of a customer's message and determine, identifying an intent based on these elements, and responding to emotional elements in a conversation, the machine learning algorithm or artificial intelligence can further assess the qualitative and quantitative aspects of an agent response before it is submitted. For instance, when the agent 112 generates a response to a customer message that is to be submitted, the agent training system 118 (using the machine learning algorithm or artificial intelligence) may evaluate the response in real-time to determine whether every identified element has been addressed in the proposed response by the agent 112. Further, the agent training system 118 may provide any feedback deemed necessary to improve the response according to the identified elements and the likelihood of a positive perception of effort by the customer 108.

The agent training system 118 may determine, based on the incoming data stream of the communications session and/or transcript of the conversation, whether the agent 112 has followed the suggestions or responses prepared by the agent training system 118. If the agent training system 118 determines that the agent 112 has not followed the suggestions or responses prepared by the agent training system 118, the agent training system 118 may perform one or more remedial actions, such as transmitting a notification to the agent 112 or supervisor of the agent 112 to indicate any necessary steps that are to be undertaken to improve the performance of the agent 112.

In an embodiment, the aforementioned machine learning algorithm is retrained based on the contexts, explicit elements, and implied elements from new conversations, as well as messages exchanged during these new conversations, data corresponding to recommendations provided to agents during these new conversations (e.g., rate of adherence to recommendations, etc.), and metrics corresponding to agent performance for these new conversations. For instance, if the machine learning algorithm is generating recommendations that are not being adhered to, and agent performance has shown improvement, the machine learning algorithm may be retrained to generate more accurate or appropriate recommendations corresponding to the actions performed by the agents that resulting in the improved performance. Alternatively, if agents are adhering to the provided recommendations and agent performance has shown improvement for these conversations, the machine learning algorithm may be trained to reinforce generation of similar recommendations.

In an embodiment, the customer service call center 102 includes a performance monitoring system 106 configured to determine agent 112 performance based on the customer 108 feedback with regard to the agent's responses during the communications session between the customer 108 and agent 112. For instance, the performance monitoring system 106 may process an incoming data stream of the communications session and/or a transcript of the conversation between the customer 108 and agent 112 to determine how the customer 108 responded to each agent 112 utterance.

In an embodiment, the performance monitoring system 106 provides feedback to the agent training system 118 with regard to the agent's compliance with the suggestions or responses prepared by the intent processing system 104 and/or agent training system 108. Further, the performance monitoring system 106 can provide, to the agent training system 118, any feedback provided by the customer 108 with regard to the communications session between the customer 108 and the agent 112. For instance, at the conclusion of a communications session or at any point during a communications session, the performance monitoring system 106 may transmit a request to the customer 108 to evaluate the performance of the agent 112 in addressing the customer's intent or other issues. The performance monitoring system 106 may prompt the customer 108 to indicate whether the agent 112 was able to effectively respond to the customer's intent or other issues in a positive manner. Further, the performance monitoring system 106 may prompt the customer 108 to indicate its sentiment with regard to the communications session. For instance, if the customer 108 had a negative experience with the agent 112 over the communications session, the customer 108 may provide feedback for agent improvement and/or for addressing the customer's intent or other issues. Alternatively, if the customer 108 has a positive experience with the agent 112 over the communications session, the customer 108 may provide feedback indicating what the agent 112 did correctly in identifying the customer's intent or other issues and in addressing the intent or other issues.

In some embodiments, the performance monitoring system 106 updates the customer profile of the customer 108 based on how the customer 108 responded to the agent's utterances during the communications session. For instance, the performance monitoring system 106 may evaluate the incoming data stream of the communications session and/or transcript of the conversation to determine whether the customer's stress or anxiety levels decreased as a result of the agent's responses to the intent. This may include a semantic analysis of the customer's utterances in comparison to known semantic patterns of the customer 108 that are categorized as being associated with customer stress or anxiety. If such a change in the customer's emotion is detected, the performance monitoring system 106 may update the customer profile of the customer 108 to indicate that the agent's utterances were effective in calming the customer 108 or otherwise assuaging the customer 108.

In an embodiment, the performance monitoring system 106 also evaluates the incoming data stream of the communications session and/or transcript of the conversation to determine whether the intent was fulfilled by the agent 112. For instance, the performance monitoring system 106 may determine whether the customer 108 has provided appreciation or other acknowledgement of its request or issue being resolved successfully by the agent 112. If so, the performance monitoring system 106 may indicate that the responses generated by the intent processing system 104 were effective in resolving the issue or request. However, if the performance monitoring system 106 determines that the intent was not fulfilled, the performance monitoring system 106 may update the intent processing system 104 to cause the intent processing system 104 to generate alternative responses that may be used to fulfill the intent. This may include updating training data that may be used to train the machine learning model or AI utilized by the intent processing system 104 to generate responses to customer intents.

The performance monitoring system 106 may obtain customer feedback through other mechanisms. For instance, at the conclusion of a communications session, the customer 108 may be provided with a form or survey that may be completed by the customer 108 in order to provide its feedback with regard to the performance of the agent 112. The customer 108 may be prompted to indicate whether the agent 112 was able to effectively use conversation gilding and respond to the emotional aspect of the conversation. Further, the customer 108 may be prompted to determine whether the agent 112 was able to fulfill the customer's intent successfully. The performance monitoring system 106 may use this feedback from the customer 108 to evaluate the agent 112 as described above.

In an embodiment, the performance monitoring system 106 tracks the performance of each agent 112 and correlates this performance with existing performance metrics for the customer service call center 102 in order to accurately identify training and coaching opportunities for groups of agents or individuals, how they impact the overall performance of the client operation, and to prioritize remedial activities. For instance, in an embodiment, the performance monitoring system 106 provides detailed metrics corresponding to the performance of each agent 112 to the agent training system 118 to identify a sequence of actions that may be performed to improve the performance of these agents in responding to customer messages. As an illustrative example, the agent training system 118 may use the detailed metrics corresponding to the performance of an agent 112 for one or more conversations, as well as the transcript or exchanged messages corresponding to these one or more conversations, as input to a machine learning algorithm or artificial intelligence to generate recommendations for performance improvements that may be performed by the agent 112 to improve their ability to identify customer intents and to respond to these intents in a manner that is likely to produce a positive response from customers. In some instances, the performance monitoring system 106 may track adherence by agents 112 to the recommendations and training provided by the agent training system 118, whereby the performance monitoring system 106 may correlate adherence to these recommendations and training to the performance of the agents 112 in providing a positive customer experience to customers associated with the customer service call center 102.

In an embodiment, the performance monitoring system 106 provides the client with a portal that can be used to track various performance metrics of the client, as well as to compare the performance of the client to the performance of competitors. The performance monitoring system 106 may present, via the portal or other interface, provide metric-driven best practices that balance efficiency and effectiveness. For instance, the performance monitoring system 106 may provide a user interface that provides a set of interactive dashboards aligned to different measurement pillars (e.g., operations, automation, intent, sales, etc.). Each of these measurement pillars may include a dashboard module and enablement framework that are used to articulate how primary and secondary KPIs influence success and client performance. The user interface may provide consolidated views of different client metrics with relevant context, such as industry benchmarks, account settings, and metric correlations.

The framework utilized by the performance monitoring system 106 to provide insights into the performance of agents associated with the customer service call center 102 may rely on metrics generated based on effort, emotion, efficiency, and effectiveness. For instance, metrics associated with effort may correspond to the amount of effort required to address a customer's intent by agents of the customer service call center 102 or other client engaged with the customer service call center 102. For instance, based on the performance of the agents in addressing customer intents and issues, the performance monitoring system 106 may determine the amount of effort required by agents to address customer intents and issues and calculate one or more metrics corresponding to this amount of effort. As an illustrative example, if a customer 108 required repeated contacts with the customer service call center 102 to address their issue, experienced multiple transfers among agents to address their issue, and/or experienced significant wait times to have their issue addressed, the performance monitoring system 106 may assign a score corresponding to a high amount of effort required to address customer intents and other issues. For instance, the performance monitoring system 106 may assign a high score that corresponds to a high amount of effort required, whereas a low score may correspond to a low amount of effort required by agents to address customer intents or issues.

Similarly, the performance monitoring system 106 may determine the level of emotion amongst customers of the customer service call center 102 or other client associated with the customer service call center 102 to calculate an emotion score for the agents. For instance, if a significant number of conversations are related to cancellations and billing disputes, which have a high propensity to be emotionally changed and, in turn, lead to a higher number of agent complaints or escalation, the performance monitoring system 106 may calculate an emotion score corresponding to a negative emotional load for customers. Alternatively, if a significant number of conversations are resolved positively, whereby customers come away pleased with the resolution, the performance monitoring system 106 may calculate an emotion score corresponding to a positive emotional load for customers.

The performance monitoring system 106 may further determine the level of efficiency of agents in handling customer intents or issues over time to calculate an efficiency score for the customer service call center 102 or other client associated with the customer service call center 102. The performance monitoring system 106, for example, may weigh the balance between available resources (e.g., agent availability, etc.) and demand (e.g., customer contacts with the customer service call center 102, etc.). For instance, if agents have a low online rate, whereby agents can only receive new conversations during limited periods of time during a day/shift, the performance monitoring system 106 may assign an efficiency score corresponding to a low level of efficiency amongst agents. Alternatively, if agents have a high online rate and are able to receive new conversations during a wider range of times during a day/shift, the performance monitoring system 106 may assign an efficiency score corresponding to a higher level of efficiency amongst agents.

The framework utilized by the performance monitoring system 106 may further provide for a determination of the level of effectiveness of agents in addressing customer intents and issues leveraging available capabilities and tools. For example, if the performance monitoring system 106 determines, based on an evaluation of the performance of agents, that agents are not leveraging automated tools for closing conversations or for distribution of conversations amongst agents, the performance monitoring system 106 may assign an effectiveness score corresponding to a low level of effectiveness amongst agents. Similarly, if the performance monitoring system 106 determines that agents are transmitting multiple messages at a rapid rate above average while leaving little to no time for the engineering of solutions to customer intents or issues, the performance monitoring system 106 may assign an effectiveness score corresponding to a low level of effectiveness amongst agents.

As noted above, the performance monitoring system 106 may provide the aforementioned scores and other metrics to administrators of the customer service call center 102 or other client associated with the customer service call center 102 via the portal or other interface. In an embodiment, in addition to these scores and other metrics, the performance monitoring system 106 utilizes a machine learning algorithm or artificial intelligence to automatically provide an assessment of all conversational operations, which may lead to data-driven decision-making for improvement of agent performance. For example, the performance monitoring system 106 may provide metrics and characteristics corresponding to conversations between agents and customers (e.g., conversation topics or intents, customer surveys or feedback, messaging rate metrics, agent availability metrics, metrics associated with the usage of automated tools or capabilities, etc.), actual conversation transcripts, and the like as input to the machine learning algorithm or artificial intelligence to obtain an assessment of agent performance and to identify possible solutions or recommendations for improvement. For example, the output of the machine learning algorithm or artificial intelligence may provide a description of what has occurred or is occurring amongst agents and customers that has resulted in the current level of performance for these agents. Further, the output of the machine learning algorithm or artificial intelligence may provide diagnostic information corresponding to rationales as to what has occurred or is occurring. For example, the output may indicate that customers are dissatisfied with the responses provided by agents because agents are taking too long to respond and are usually unable to identify the customer issue in a timely manner or are otherwise unable to address the customer issue.

In some instances, the machine learning algorithm utilized by the performance monitoring system 106 to provide an assessment of agent performance and to identify solutions and recommendations for improvement may be retrained based on updated performance metrics for agents resulting from adherence or neglect of provided solutions and recommendations. For instance, a client may provide feedback with regard to agent performance resulting from implementation of the provided solutions and recommendations. This feedback may be used to retrain the machine learning algorithm to either reinforce the algorithm (e.g., adherence to the solutions and recommendations has led to a marked improvement in agent performance) or retrain the algorithm to provide more accurate or appropriate solutions and recommendations (e.g., adherence to the solutions and recommendations has led to no change or a marked worsening in agent performance). In some instances, the performance monitoring system 106 may evaluate agent performance over time, as well as adherence to provided solutions and recommendations, to determine whether there is a correlation between agent performance and adherence to the provided solutions and recommendations. Based on this evaluation, the performance monitoring system 106 may retrain the machine learning algorithm to provide better solutions and recommendations based on agent performance.

In addition to providing a description of the issues facing customer-agent conversations and the reasons behind these issues, the machine learning algorithm or artificial intelligence may provide one or more recommendations for how to correct these issues to improve the customer experience. For instance, using the above example where customers are dissatisfied due to agents taking too long to respond to customers and unable to identify customer issues in a timely manner, the machine learning algorithm or artificial intelligence may recommend remedial training for agents to better identify these issues using automated tools, such as a tool configured to process customer messages to identify issues or intents. If such tools are already implemented, and agents have not used these tools effectively, the machine learning algorithm or artificial intelligence may recommend that agents be trained on how to utilize these tools effectively or, alternatively, to have all messages processed using these tools automatically in order to provide agents with appropriate recommendations for identifying and addressing customer intents and issues.

In an embodiment, the performance monitoring system 106, using the machine learning algorithm or artificial intelligence, can further provide, via the portal or other interface, with a prediction as to the improvement in the performance of agents should the aforementioned recommendations be implemented. For instance, the machine learning algorithm or artificial intelligence may indicate that the metrics corresponding to effort, emotion, efficiency, and effectiveness may improve by a certain margin if the provided recommendations are implemented. The machine learning algorithm or artificial intelligence may provide this prediction using numerical metric values (e.g., "efficiency will improve 56%," etc.) and/or descriptive narratives (e.g., "agent efficiency should increase dramatically"), which may be presented via the portal or other interface in conjunction with the description of the identified issues, diagnostic information describing why these issues are occurring or have occurred, and the recommendations to address these issues.

The machine learning algorithm or artificial intelligence may be dynamically trained using supervised training techniques. For instance, a dataset of input conversations, feedback, agent performance metrics, known improvement procedures, and resulting outcomes as a result of applying or disregarding the improvement procedures can be selected for training of the machine learning model. The machine learning model may be evaluated to determine, based on the sample inputs supplied to the machine learning model, whether the machine learning model is extracting the expected recommendations and predictions based on the performance of agents in addressing customer intents or issues. Based on this evaluation, the machine learning model may be modified to increase the likelihood of the machine learning model generating the desired results. The machine learning model may further be dynamically trained by soliciting feedback from clients, including the customer service call center 102 or client associated with the agents 112, with regard to the evaluations, recommendations, and predictions provided by the machine learning algorithm or artificial intelligence for improving agent performance. For instance, if the customer service call center 102 implements one or more recommendations provided by the machine learning algorithm or artificial intelligence, the performance monitoring system 106 may obtain new performance metrics corresponding to the agents 112 based on their performance in addressing conversations with customers. The performance monitoring system 106 may determine what steps were taken by the customer service call center 102 and the agents 112 to address the issues identified by the performance monitoring system 106 and determine whether the new performance metrics correspond to the predicted performance improvement indicated by the machine learning algorithm or artificial intelligence. This determination (including variances, etc.) may be used to further train the machine learning algorithm or artificial intelligence to provide more accurate predictions of performance improvements and to better generate recommendations for performance improvements.

In an embodiment, the performance monitoring system 106 further provides a benchmarking dashboard or other interface through which administrators may compare the performance of their agents against targets and/or industry groups across various KPIs, such as those described above. For instance, administrators and other entities, via the benchmarking dashboard, may select one or more targets and/or industry groups for which the performance monitoring service 106 may generate comparisons across the various KPIs. These one or more targets and/or industry groups may also utilize the performance monitoring system 106 for evaluation of their agents and organization with regard to their performance in conversations with customers. Additionally, or alternatively, the performance monitoring system 106 may obtain various performance metrics for these one or more targets and/or industry groups through other sources (e.g., publications, third-party performance evaluators, etc.).

The performance monitoring system 106 may indicate, via the benchmarking dashboard, any insights related to actions taken by the one or more targets and/or industry groups selected by the administrators to achieve their performance metrics. For instance, the performance monitoring system 106 may provide, for a particular target, performance metrics prior to the performance of one or more actions (e.g., implementing automated capabilities for identifying customer intents, training agents to adhere to recommendations from the agent training system 118, etc.) and performance metrics after performance of the one or more actions. This may allow an administrator to readily determine the impact of these actions and determine whether similar actions may be implemented for its agents. In some instances, the performance monitoring system 106 may provide insights regarding the issues encountered by the one or more targets and/or industry groups, the reasons these issues were encountered, what actions were taken or recommended to address these issues, and the results stemming from performance or omission of these actions.

In some instances, the performance monitoring system 106 may provide, via the benchmarking dashboard, a comparison of the KPIs for the organization (e.g., customer service call center 102, etc.) to the KPIs for the one or more targets and/or industry groups by intent and/or line of business. For instance, the performance monitoring system 106 may aggregate performance metrics for various agents 112 according to particular intents, categories of intents, and/or lines of business as determined by the performance monitoring system 106 via evaluation of conversation transcripts and any information provided with regard to the operation of the organization (e.g., business units, issues typically addressed by the organization, etc.). The performance monitoring system 106 may generate comparisons between the performance metrics for the organization and one or more targets and/or industry groups according to the particular intents, categories, and/or lines of business selected by an administrator utilizing the benchmarking dashboard. This may provide more granular detail with regard to the performance of agents 112 in addressing different intents or in addressing issues related to different lines of business.

The performance monitoring system 106 may include a configuration engine that allows clients (e.g., the customer service call center 102, etc.) to define reporting units and save data in relevant segmentations. These segmentations may persist over time, eliminating the time spent defining filters and, thus, reducing the time to generate insights. Clients may also label reporting units via the user interface, with descriptive data such as 24/7 Operations, Dedicated Messaging Agents, Program Goals, and the like.

Figure 2:
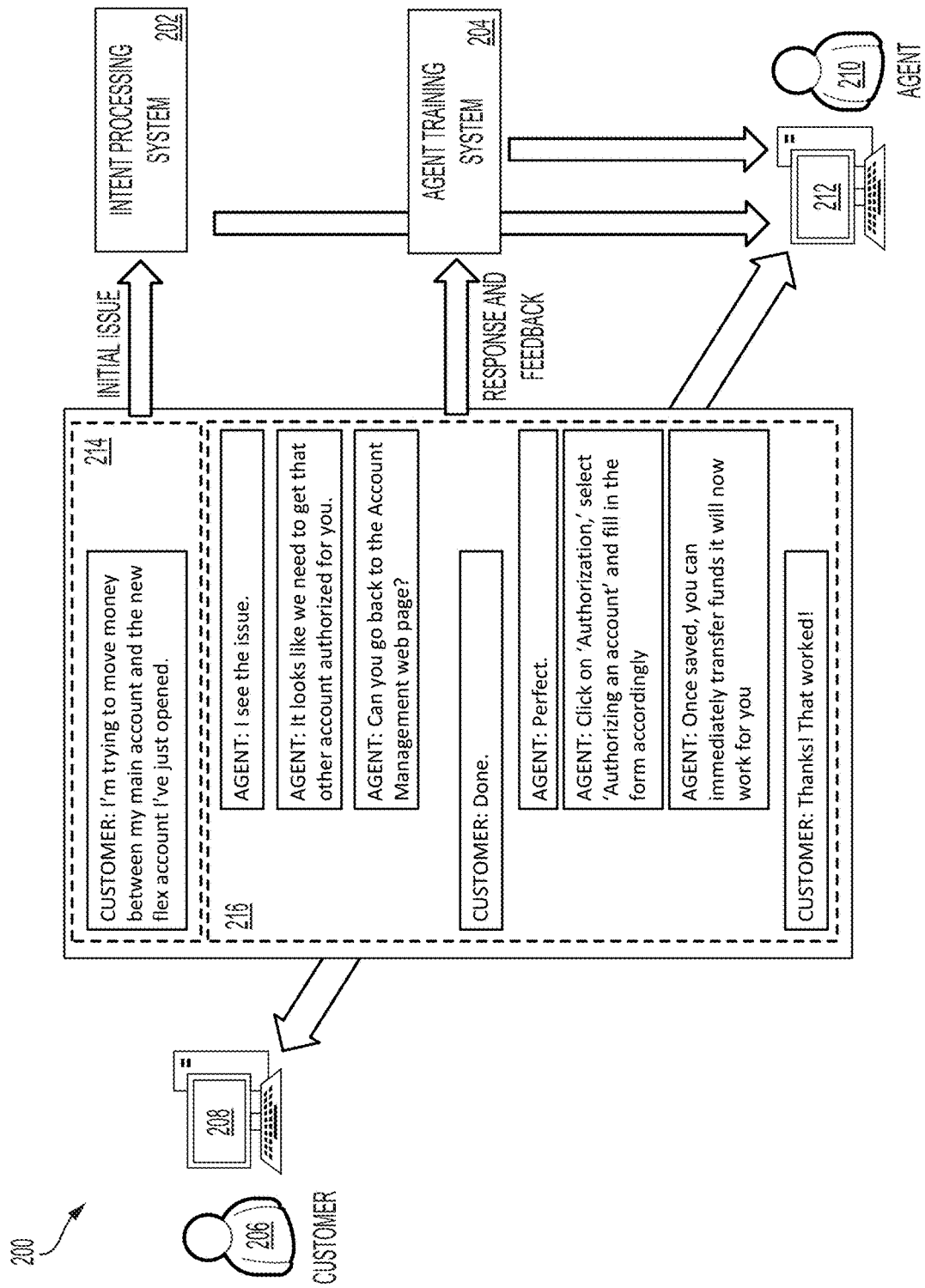
FIG. 2 shows an illustrative example of an environment in which an intent, responses, and feedback obtained during a communications session between a customer and an agent are evaluated to determine a performance of the agent in accordance with at least one embodiment.

FIG. 2 shows an illustrative example of an environment 200 in which an intent 214, responses 216, and feedback obtained during a communications session between a customer 206 and an agent 210 are evaluated to determine a performance of the agent 210 in accordance with at least one embodiment. The customer 206 and the agent 210 may be engaged in a communications session established via a network device 208 and a terminal device 212, respectively.

In the environment 200, the customer 206 may submit, to an intent processing system 202 via the communications session, an intent 214. For example, as illustrated in FIG. 2, the customer 206 has indicated that it is trying to move money between its main account and a new flex account that it has opened. The intent processing system 202 may evaluate this intent 214 to determine the issue that the customer 206 wishes to have addressed. In this particular instance, the customer 206 may be having trouble transferring funds from one online account to another account. Based on the provided intent 214, the intent processing system 202 may determine the context that the request or issue is shared in, the level of urgency, the stress or anxiety level of the customer 206, whether there is a time pressure, and the like. Further, the intent processing system 202 may identify, based on the intent 214, what the customer 206 wishes to have resolved.

In an embodiment, based on the identified intent 214, the intent processing system 202 identifies the process required in order to resolve the issue or request provided by the customer 206. For example, based on the intent 214 provided by the customer 206, the intent processing system 202 may determine that accounts have to be authorized before customers can transfer funds into them. Further, the intent processing system 202 may determine that authorizing an account can be performed online. Based on the identified process, the intent processing system 202 may develop a strategy for responding to the customer intent 214 in a manner that would not only resolve the intent but do so in a manner that leads to a positive customer experience. This may include developing a foundation for the response, a desired result of the response, and/or any positive additions to give flavor to the response. The contents of the proposed response may be generated based on customer preferences as identified in the customer profile via analysis of past customer interactions with agents.

The intent processing system 202 may provide the proposed response strategy and prepared responses to the agent 210, which the agent 210 can use to prepare a response to the customer intent 214. As illustrated in FIG. 2, the agent 210 can provide a confirmation indicating that it understands the issue ("I see the issue") and provides a solution to the intent 214 using language that may be appealing to the customer 206.

In an embodiment, an agent training system 204 monitors the interactions between the customer 206 and agent 210 to determine whether the agent 210 is adhering to the proposed response strategy generated by the intent processing system 202 in addressing the intent 214. For instance, the agent training system 204 may evaluate any customer utterances to determine whether the intent 214 is being fulfilled. Further, the performance monitoring system 204 may evaluate the agent's utterances to determine whether these comport with the proposed responses and strategy provided by the intent processing system 202. As an illustrative example, the agent training system 204 may determine that when the customer 206 responds with "Done," the customer 206 has acknowledged the agent's instructions and was able to follow these instructions to perform an operation successfully. Further, when the customer 206 responds with "Thanks! That worked!" the agent training system 204 may determine that the customer 206 is grateful for the assistance provided by the agent 210 and has had a positive experience. This information may be used to gauge the performance of the agent 210, as well as input that may be used to update the customer profile to provide additional data points for determining how best to respond to customer intents.

In an embodiment, if the agent training system 204 determines that the agent 210 has not adhered to the proposed response strategy and prepared responses provided by the intent processing system 202 or otherwise has not adhered to the recommendations provided by the agent training system 204, the agent training system 204 may communicate with the agent 210 to reinforce the proposed response strategy to further encourage the agent 210 to incorporate the proposed response strategy and prepared responses when communicating with the customers with regard to the particular and/or similar intents. Additionally, or alternatively, the agent training system 204 may transmit a notification to an administrator or other supervisor of the agent 210 to indicate any necessary steps that are to be undertaken to encourage the agent 210 to adhere to the recommendations provided by the agent training system 204 and/or to the proposed response strategy and prepared responses provided by the intent processing system 202.

As noted above, the agent training system 204 provides a framework designed to assist virtual and/or human agents to deliver a positive conversational experience to customers. The agent training system 204 may operate under an "analyze, identify, respond" framework, through which the agent training system 204 may identify any improvements that may be made by an agent 210 to better respond to customers. The agent training system 204 may process historical data corresponding to previous interactions between agents and customers to identify explicit and implied elements in customer responses and to contextualize these responses. This process may result in the creation of a conditional logic that may be used by agents as they identify what the detected implicit and explicit elements of a customer's message pertains to. In some embodiments, this conditional logic and the identified improvements may be used to further enhance the intent processing system 202 to enable the intent processing system 202 to better identify the explicit and implied elements in customer responses in real-time and to dynamically generate recommended responses that may be provided to the agent 210 to better guide the agent 210 in providing responses to customers that are likely to produce a positive resolution to the customers' intents. Further, the agent training system 204 can assess the qualitative and quantitative aspects of an agent response before it is submitted. The agent training system 204 may evaluate the response in real-time to determine whether every identified element has been addressed in the proposed response by the agent 210.

Figure 3:
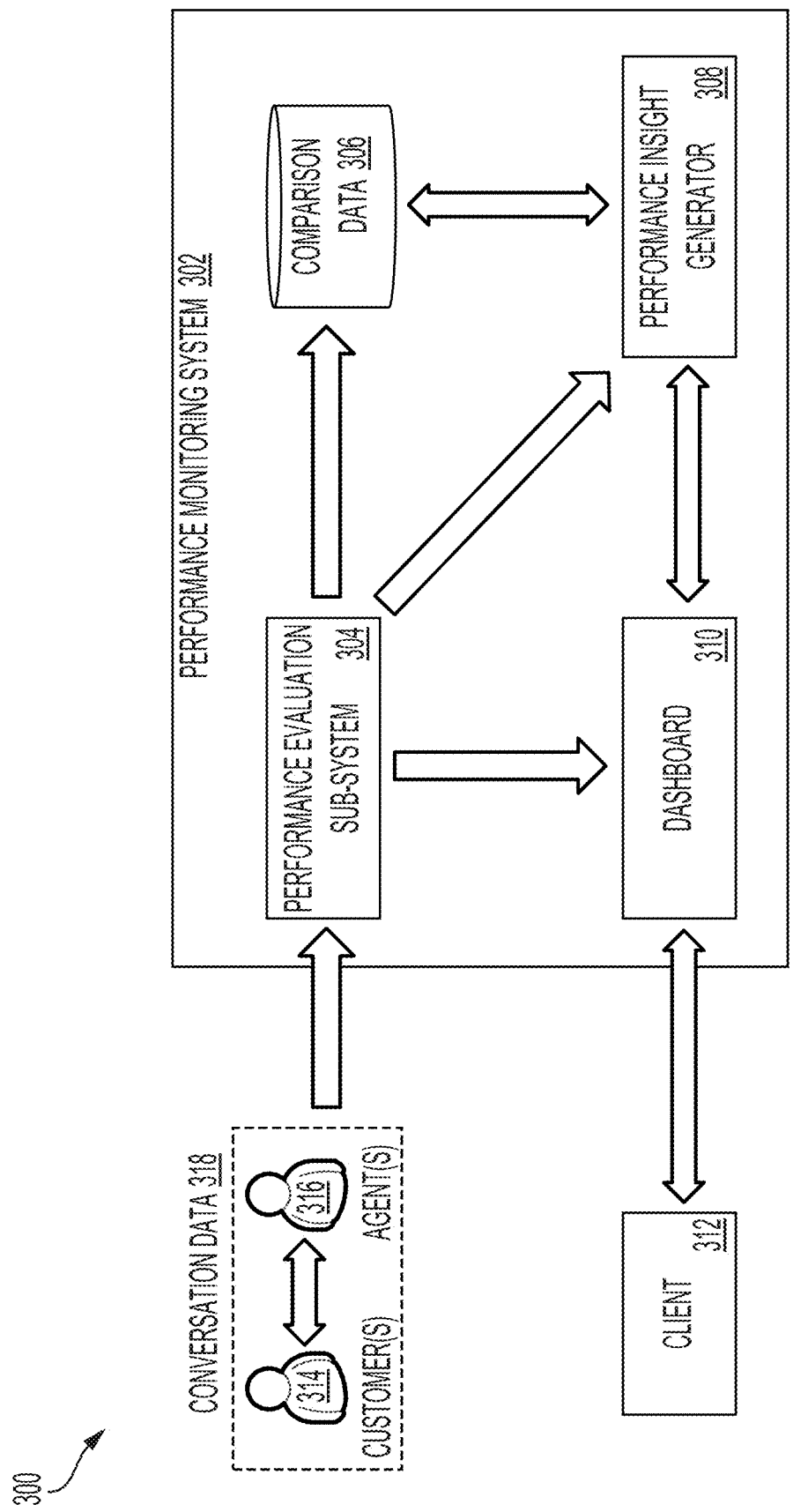
FIG. 3 shows an illustrative example of an environment in which a performance monitoring service measures and manages the performance of an organization's conversational operations in accordance with at least one embodiment.

FIG. 3 shows an illustrative example of an environment 300 in which a performance monitoring service 302 measures and manages the performance of an organization's conversational operations in accordance with at least one embodiment. In the environment 300, the performance monitoring system 302 may process conversation data 318 generated based on conversations between customer 314 and agents 316 associated with a customer service call center to generate performance metrics for the agents 316 and to provide various insights related to the performance of these agents 316. In an embodiment, the performance monitoring system 302 includes a performance evaluation sub-system 304 that is configured to process conversation data 318 to generate the performance metrics of agents 316. The performance evaluation sub-system 304 may be implemented using a computing device associated with the performance monitoring system 302.

The performance evaluation sub-system 304 may obtain the conversation data 318 periodically. For instance, the performance evaluation sub-system 304 may access a conversation data repository or datastore maintained by the customer service call center or other entity tasked with maintaining records associated with existing conversations between customers 314 and agents 316. The conversation data repository or datastore may include a conversation transcript or record corresponding to each conversation processed by the customer service call center. The conversation transcript or record may include the various messages exchanged between a particular customer and one or more agents during the course of a conversation to address a particular intent or issue. A conversation transcript or record may thus be associated with a particular customer and the particular intent or issue that the customer sought to have resolved. Further, a conversation transcript or record may include identifying information associated with the agent or set of agents (e.g., virtual and/or human) that were engaged with the customer to address the particular intent or issue. Thus, the performance evaluation sub-system 304 may process an existing conversation and generate performance metrics associated with the agent or set of agents for the existing conversation, associate these performance metrics with a particular intent, customer, and/or line of business, and create correlations between an agent's performance and the particular intent/type of intent, customer, and/or line of business.

In an embodiment, the performance evaluation sub-system 304 can process conversation data 318 for a conversation in real-time to determine the real-time performance of an agent or set of agents with regard to the particular conversation. For instance, the performance evaluation sub-system 304 may be configured to evaluate an incoming data stream of messages corresponding to existing conversations between customers 314 and agents 316 to determine a dynamic set of performance metrics for these agents 316 in real-time. As an illustrative example, when a new message is exchanged between a particular customer and agent, the performance evaluation sub-system 304 may calculate one or more performance metrics for the agent. If the performance evaluation sub-system 304 detects that a new message has been exchanged, the performance evaluation sub-system 304 may dynamically and in real-time re-calculate the one or more performance metrics for the agent, thus providing updated performance metrics for the agent.

As noted above, these performance metrics may correspond to a framework built upon customer and client interests tied to effort, emotion, efficiency, and effectiveness. For instance, metrics associated with effort may correspond to the amount of effort required to address a customer's intent by agents 316. For instance, based on the performance of the agents 316 in addressing customer intents and issues, the performance evaluation sub-system 304 may determine the amount of effort required by agents 316 to address customer intents and issues and calculate one or more metrics corresponding to this amount of effort. Similarly, the performance evaluation sub-system 304 may determine the level of emotion amongst customers 314 while engaged in conversations with agents 316 to calculate an emotion score for the agents. The performance evaluation sub-system 304 may further determine the level of efficiency of agents 316 in handling customer intents or issues over time to calculate an efficiency score for each agent by weighing the balance between available resources (e.g., agent availability, etc.) and demand (e.g., customer contacts with the client, etc.). The performance evaluation sub-system 304 may further provide for a determination of the level of effectiveness of agents 316 in addressing customer intents and issues leveraging available capabilities and tools.

In an embodiment, the performance evaluation sub-system 304 presents the calculated performance metrics for each agent or set of agents 316 to a client 312 over a dashboard 310 provided by the performance monitoring system 302. The performance evaluation sub-system 304 may present the calculated performance metrics according to one or more configuration settings provided by the client 312. For instance, if a client 312 indicates that it would like to view aggregated performance metrics for agents according to the line of business or other classification of agents, the performance evaluation sub-system 304 may aggregate these performance metrics according to the line of business or other classification of agents (as indicated by the client 312) and present the aggregated performance metrics to the client 312 via the dashboard 310. In some instances, a client 312, via the dashboard 310, may submit a query to obtain the performance metrics for a particular agent or set of agents. In response to the query, the performance evaluation sub-system 304 may aggregate the performance metrics for the particular agent or set of agents and update the dashboard 310 to provide the aggregated performance metrics. In an embodiment, the performance evaluation sub-system 304 can update the dashboard 310 dynamically and in real-time to provide up-to-date performance metrics for agents 316 while messages are being exchanged between customers 314 and agents 316 in real-time. This may allow the client 312 to track the performance of any agent in real-time and potentially identify any agent issues as they occur.

In an embodiment, in addition to these performance metrics, the performance monitoring system 302 may generate various insights into agent performance that may be used to identify areas of improvement or reinforcement for agents 316 associated with a client 312. For instance, as illustrated in FIG. 3, the performance evaluation sub-system 304 may transmit conversation data 318, as well as the calculated performance metrics for the agents 316, to a performance insight generator 308 to identify these areas of improvement or reinforcement and to provide any valuable insights into the conversational operations of the client 312. The performance insight generator 308 may be implemented using a computing device associated with the performance monitoring system 302.

In an embodiment, the performance insight generator 308 utilizes a machine learning algorithm or artificial intelligence to automatically provide an assessment of the client's conversational operations, which may lead to data-drive decision-making for improvement of agent performance. For example, the performance insight generator 308 may provide metrics and characteristics corresponding to conversations between agents and customers (e.g., conversation topics or intents, customer surveys or feedback, messaging rate metrics, agent availability metrics, metrics associated with the usage of automated tools or capabilities, etc.), actual conversation transcripts, and the like (as provided by the performance evaluation sub-system 304, obtained directly from the client 312, etc.) as input to the machine learning algorithm or artificial intelligence to obtain an assessment of agent performance and to identify possible solutions or recommendations for improvement. The output of the machine learning algorithm or artificial intelligence may provide a description of what has occurred or is occurring amongst agents 316 and customers 314 that has resulted in the current level of performance for these agents 316. Further, the output of the machine learning algorithm or artificial intelligence may provide diagnostic information corresponding to rationales as to what has occurred or is occurring. For example, the output may indicate that customers 314 are dissatisfied with the responses provided by agents 316 because agents 316 are taking too long to respond and are usually unable to identify the customer issue in a timely manner or are otherwise unable to address the customer issue.

The performance insight generator 308 may further provide one or more recommendations for how to correct these issues to improve the customer experience. For instance, using the above example where customers are dissatisfied due to agents taking too long to respond to customers and unable to identify customer issues in a timely manner, the machine learning algorithm or artificial intelligence utilized by the performance insight generator 308 may recommend remedial training for agents to better identify these issues using automated tools. If such tools are already implemented, and agents 316 have not used these tools effectively, the machine learning algorithm or artificial intelligence may recommend that agents 316 be trained on how to utilize these tools effectively or, alternatively, to have all messages processed using these tools automatically in order to provide agents with appropriate recommendations for identifying and addressing customer intents and issues.

In addition to providing one or more recommendations for improving or reinforcing agent performance, the performance insight generator 308 may provide predictions as to how the performance of agents 316 may be impacted by implementing the one or more recommendations. For instance, the performance insight generator 308 may indicate that the metrics corresponding to effort, emotion, efficiency, and effectiveness may improve by a certain margin if the provided recommendations are implemented. The performance insight generator 308 may provide this prediction using numerical metric values (e.g., "efficiency will improve 56%," etc.) and/or descriptive narratives (e.g., "agent efficiency should increase dramatically"), which may be presented via the dashboard 310 in conjunction with the description of the identified issues, diagnostic information describing why these issues are occurring or have occurred, and the recommendations to address these issues.

As noted above, the performance monitoring system 302 may provide a dashboard 310 through which a client 312 may compare the performance of its agents 316 against targets and/or industry groups across various performance metrics (e.g., KPIs). For instance, client 312, via the dashboard 310, may select one or more targets and/or industry groups for which the performance monitoring service 302 may generate comparisons across the various performance metrics. These one or more targets and/or industry groups may also utilize the performance monitoring system 302 for evaluation of their agents and organization with regard to their performance in conversations with customers. Additionally, or alternatively, the performance monitoring system 302 may obtain various performance metrics for these one or more targets and/or industry groups through other sources (e.g., publications, third-party performance evaluators, etc.).

In an embodiment, the performance monitoring system 302 stores performance data associated with the client 312 and with other targets and/or industry groups in a comparison datastore 306. For instance, when the performance evaluation sub-system 304 calculates performance metrics for a set of agents associated with a client 312, the performance evaluation sub-system 304 may store the performance metrics associated with the client 312 in the comparison datastore 306. Further, the insights, recommendations, and predictions generated by the performance insight generator 308 based on the performance metrics of agents 316 associated with the client 312 may also be stored in the comparison datastore 306 in association with the performance metrics calculated by the performance evaluation sub-system 304 for the agents 316. This process may be performed for each client associated with the performance monitoring system 302 such that the comparison datastore 306 may store comparable performance metrics and insights for each client.

Additionally, the comparison datastore 306 may store data for other targets and/or industry groups that may not be serviced by the performance monitoring system 302 but that otherwise may provide a benchmark for determining the relative performance of clients associated with the performance monitoring system 302. For instance, the performance monitoring system 302 may obtain various performance metrics for these one or more targets and/or industry groups through other sources (e.g., publications, third-party performance evaluators, etc.). For instance, the performance monitoring system 302 may be subscribed to one or more data streams associated with other sources of performance metrics to obtain performance metrics for these one or more targets and/or industry groups. In some instances, if the obtained performance metrics or other data associated with the one or more targets and/or industry groups is not in a format conducive to providing benchmarking comparisons with performance metrics of a client 312, the performance monitoring system 302 may process the obtained performance metrics or other data using the performance evaluation sub-system 304 to generate a new set of performance metrics for the one or more targets and/or industry groups that can be used for benchmarking purposes as described herein.

Through the dashboard 310, the performance monitoring system 302 may indicate any insights related to actions taken by the one or more targets and/or industry groups selected by the client 312 to achieve their corresponding performance metrics along different classifications (e.g., line of business, per type of agent, etc.). For instance, the performance monitoring system 302 may provide, for a particular target and via the dashboard 310, performance metrics for a particular target prior to the performance of one or more actions (e.g., implementing automated capabilities for identifying customer intents, training agents to adhere to recommendations from the agent training system, etc.) and performance metrics for the particular target after performance of the one or more actions. This may allow the client 312 to readily determine the impact of these actions and determine whether similar actions may be implemented for its agents 316. In some instances, the performance monitoring system 302, via the performance insight generator 308, may provide insights regarding the issues encountered by the one or more targets and/or industry groups, the reasons these issues were encountered, what actions were taken or recommended to address these issues, and the results stemming from performance or omission of these actions.

In some instances, based on the insights and recommendations provided by the performance insight generator 308 and presented via the dashboard 310, the client 312 may request that the provided insights and recommendations be used by the agent training system to define a sequence of actions that are performed to accurately capture critical elements expressed by customers 314 in conversations with agents 316 and to identify how best to respond to customers 314 adequately. As noted above, the agent training system may be configured to address situational and emotional elements (whether explicit or implied) to enable agents 316 to fulfill customer intents and expectations while maintaining fluid and natural conversations. Based on the insights and recommendations provided by the performance insight generator 308, the agent training system may identify what actions may be taken to address these elements in order to enable agents 316 to fulfill customer intents and expectations according to the generated insights and recommendations.

Figure 4:
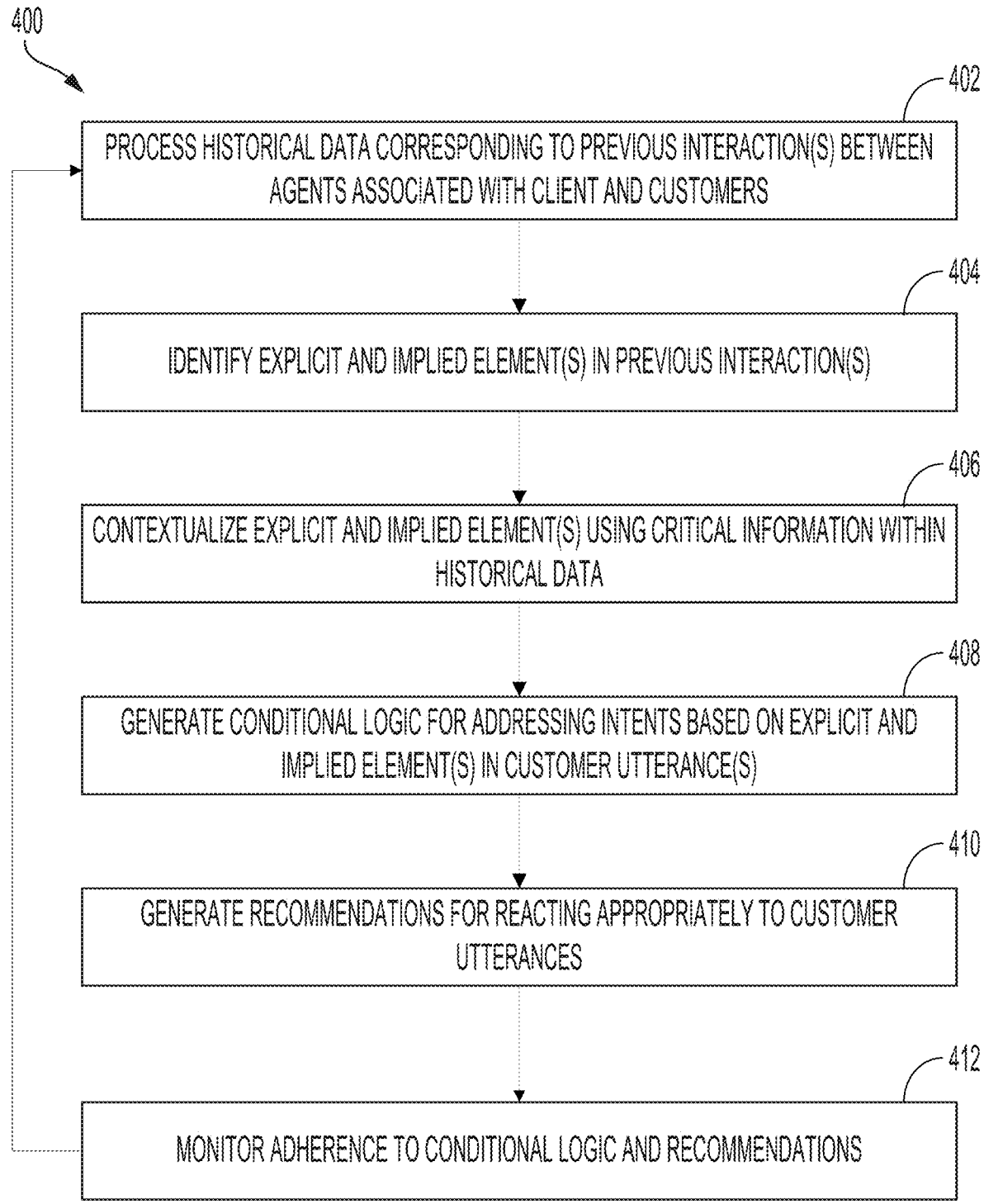
FIG. 4 shows an illustrative example of a process 400 for implementing a framework to assist agents in responding to customer utterances during conversations in accordance with at least one embodiment.

FIG. 4 shows an illustrative example of a process 400 for implementing a framework to assist agents in responding to customer utterances during conversations in accordance with at least one embodiment. The process 400 may be performed by an agent training system of a customer service call center. The agent training system, as described above, may be configured to define a sequence of actions that are performed to accurately capture critical elements expressed by customers in conversations with agents and to identify how best to respond to customers adequately. Further, the agent training system may be configured to address situational and emotional elements (whether explicit or implied) to enable agents to fulfill customer intents and expectations while maintaining fluid and natural conversations.

At step 402, the agent training system processes historical data corresponding to previous interactions between agents associated with a client and customers. This historical data may be obtained from a CRM system maintained by the client or from a historical conversation datastore maintained by the agent training system. The agent training system 118 may process historical conversation data corresponding to conversations between agents and customers of the client, as well as corresponding customer profiles of the customers, to identify explicit and implied elements in customer responses and to contextualize these responses. In some instances, the agent training system can obtain, from the performance monitoring system, performance metrics associated with the client. For instance, the agent training system may query the performance monitoring system to obtain performance metrics for each agent associated with a client, as well as any insights or recommendations generated by the performance monitoring system for improvement of these performance metrics.

At step 404, the agent training system identifies the explicit and implied elements in the previous interactions specified in the historical data. The agent training system may process these previous interactions using a machine learning algorithm or artificial intelligence trained to extract the explicit and implied elements in these previous interactions and to identify any intents and/or issues presented by the corresponding customers during these interactions. Additionally, in an embodiment, the agent training system can evaluate these interactions to measure agent performance in identifying the explicit and implied elements in the customer utterances during these previous interactions. This agent performance in identifying the explicit and implied elements may be evaluated against the performance metrics obtained from the performance monitoring system for the corresponding agents, thereby creating a correlation between agent performance in identifying explicit and implied elements in a conversation and the performance metrics calculated by the performance monitoring system for the agent.

At step 406, the agent training system can contextualize the identified explicit and implied elements of the previous interactions using critical information within the historical data For instance, the agent training system may obtain data corresponding to prior evaluations of past communications sessions provided by customers as associated with the previous interactions recorded in the historical data. The data corresponding to these prior evaluations may indicate particular elements of the customer's communications that may indicate certain emotions, pressures, intents, and the like. Thus, based on these histories and on the elements identified from the customer utterance, the agent training system may determine what the identified elements in the customer utterances pertain to in the context of the previous interactions.

At step 408, the agent training system generates conditional logic that can be used by agents to address intents based on explicit and implied elements of a customer's utterance. For instance, the output of the aforementioned machine learning algorithm or artificial intelligence may provide conditional logic that may be used by agents as they identify what the detected implicit and explicit elements of a customer's message pertains to. This conditional logic may introduce different elements for addressing the intent identified based on the detected implicit and explicit elements of a customer's message. For instance, the conditional logic may include a component that serves to address the customer's intent (e.g., what the customer may be requesting or wanting when they started messaging the client) and a component that constitutes another section corresponding to a probable next question or action that is to be taken by a customer.

At step 410, the agent training system, in addition to these elements, can provide recommendations for reacting appropriately to positive or negative emotional elements in a conversation such as frustration, disappointment, stress, pleasure, happiness, contentment, etc. For instance, the agent training system may provide, as recommendations, sample responses to customer utterances corresponding to different emotional elements in a conversation. These sample responses may be generated to provide a more positive emotional response from customers, which in turn may lead to improved customer feedback with regard to the conversation. The one or more recommendations may further provide agents with instructions to utilize one or more automated tools to more efficiently handle certain intents or issues. For instance, if a customer's intent is related to a payment bill, the agent training system may recommend that the agent utilize an automated billing system to address the customer's intent automatically.

At step 412, the agent training system may monitor agent adherence to the conditional logic and recommendations provided by the agent training system to the agents associated with a client. For instance, the agent training system may assess the qualitative and quantitative aspects of an agent response before it is submitted. When an agent generates a response to a customer message that is to be submitted, the agent training system (using the machine learning algorithm or artificial intelligence) may evaluate the response in real-time to determine whether every identified element has been addressed in the proposed response by the agent. Further, the agent training system may provide any feedback deemed necessary to improve the response according to the identified elements and the likelihood of a positive perception of effort by the customer. Further, the agent training system may evaluate an incoming data stream of a communications session and/or transcripts of conversations to determine whether agents are following the recommendations and conditional logic provided by the agent training system. If the agent training system determines that an agent has not followed the recommendations and conditional logic prepared by the agent training system, the agent training system may perform one or more remedial actions, such as transmitting a notification to the agent or supervisor of the agent to indicate any necessary steps that are to be undertaken to improve the performance of the agent.

Figure 5:
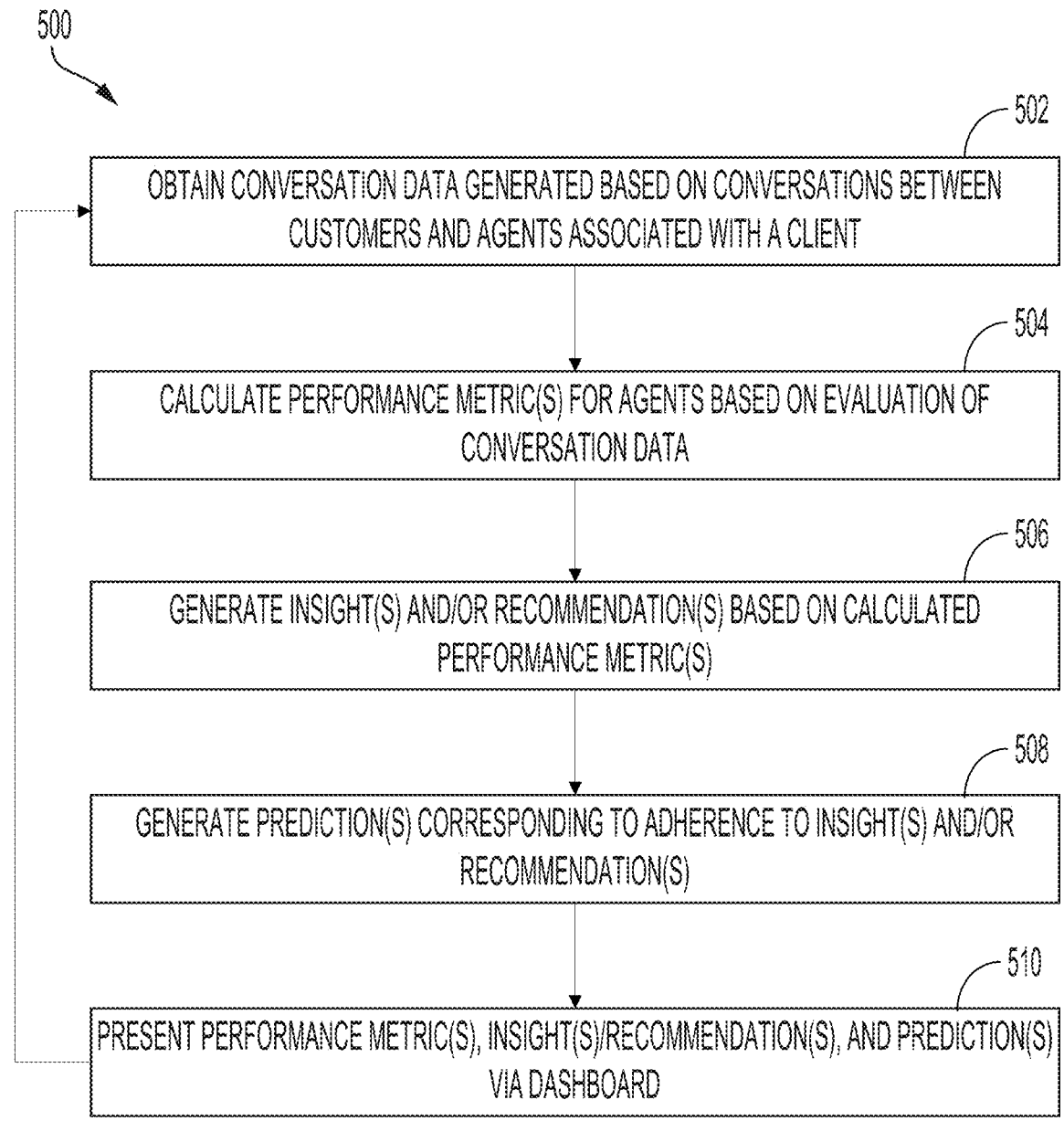
FIG. 5 shows an illustrative example of a process 500 for generating a set of performance metrics and recommendations for improvement or reinforcement of the set of performance metrics for a client in accordance with at least one embodiment.

FIG. 5 shows an illustrative example of a process 500 for generating a set of performance metrics and recommendations for improvement or reinforcement of the set of performance metrics for a client in accordance with at least one embodiment. The process 500 may be performed by the performance monitoring system, which may generate insights and recommendations for improvement of performance metrics associated with agents of a client. At step 502, the performance monitoring system obtains conversation data generated based on conversations between customers and agents associated with a client. The conversation data may include a transcript or other data corresponding to messages exchanged between customers and agents associated with the client over a period of time. For instance, the conversation data for a particular conversation may include the messages exchanged between a customer and one or more agents for the resolution of an intent or other issues presented by the customer. Further, the conversation data may include any feedback provided by the customer with regard to the performance of the one or more agents with which the customer may have interacted. The performance monitoring system may access a conversation data repository or datastore maintained by the client or other entity tasked with maintaining records associated with existing conversations between customers and agents to obtain the conversation data.

At step 504, the performance monitoring system may calculate one or more performance metrics (e.g., KPIs) for agents based on an evaluation of the conversation data. As noted above, these performance metrics may correspond to a framework built upon customer and client interests tied to effort, emotion, efficiency, and effectiveness. Performance metrics associated with effort may correspond to the amount of effort required to address a customer's intent by agents. Similarly, the performance monitoring system may determine the level of emotion amongst customers while engaged in conversations with agents to calculate an emotion score for the agents. The performance monitoring system may further determine the level of efficiency of agents in handling customer intents or issues over time to calculate an efficiency score for each agent by weighing the balance between available resources (e.g., agent availability, etc.) and demand (e.g., customer contacts with the client, etc.). The performance monitoring system may further provide for a determination of the level of effectiveness of agents in addressing customer intents and issues leveraging available capabilities and tools.

At step 506, the performance monitoring system may generate one or more insights and/or recommendations based on the calculated performance metrics. For instance, in an embodiment, the performance monitoring system can use a machine learning algorithm or artificial intelligence to automatically provide an assessment of all conversational operations, which may lead to data-drive decision-making for improvement of agent performance. For example, the performance monitoring system may provide metrics and characteristics corresponding to conversations between agents and customers (e.g., conversation topics or intents, customer surveys or feedback, messaging rate metrics, agent availability metrics, metrics associated with the usage of automated tools or capabilities, etc.), actual conversation transcripts, and the like as input to the machine learning algorithm or artificial intelligence to obtain an assessment of agent performance and to identify possible solutions or recommendations for improvement. The output of the machine learning algorithm or artificial intelligence may provide diagnostic information corresponding to rationales as to what has occurred or is occurring. Further, the output may provide one or more recommendations for how to correct these issues to improve the customer experience.

At step 508, the performance monitoring system generates one or more predictions corresponding to the adherence to the insights and/or recommendations generated by the performance monitoring system. For instance, using the aforementioned machine learning algorithm or artificial intelligence, the performance monitoring system may provide one or more predictions as to the improvement in the performance of agents should the aforementioned insights and/or recommendations be implemented. For instance, the machine learning algorithm or artificial intelligence may indicate that the metrics corresponding to effort, emotion, efficiency, and effectiveness may improve by a certain margin if the provided recommendations are implemented. The machine learning algorithm or artificial intelligence may provide this prediction using numerical metric values (e.g., "efficiency will improve 56%," etc.) and/or descriptive narratives (e.g., "agent efficiency should increase dramatically").

At step 510, the performance monitoring system may present the calculated performance metrics, insights and/or recommendations, and predictions via a dashboard or other interface accessible by the client. For instance, via the dashboard, a client may be presented with the aforementioned predictions in conjunction with the description of the identified issues, diagnostic information describing why these issues are occurring or have occurred, and the recommendations to address these issues. Further, via the dashboard, the client may be presented with the performance metrics across various intents, agent types, and/or lines of business based on the client's desired presentation of data.

Figure 6:
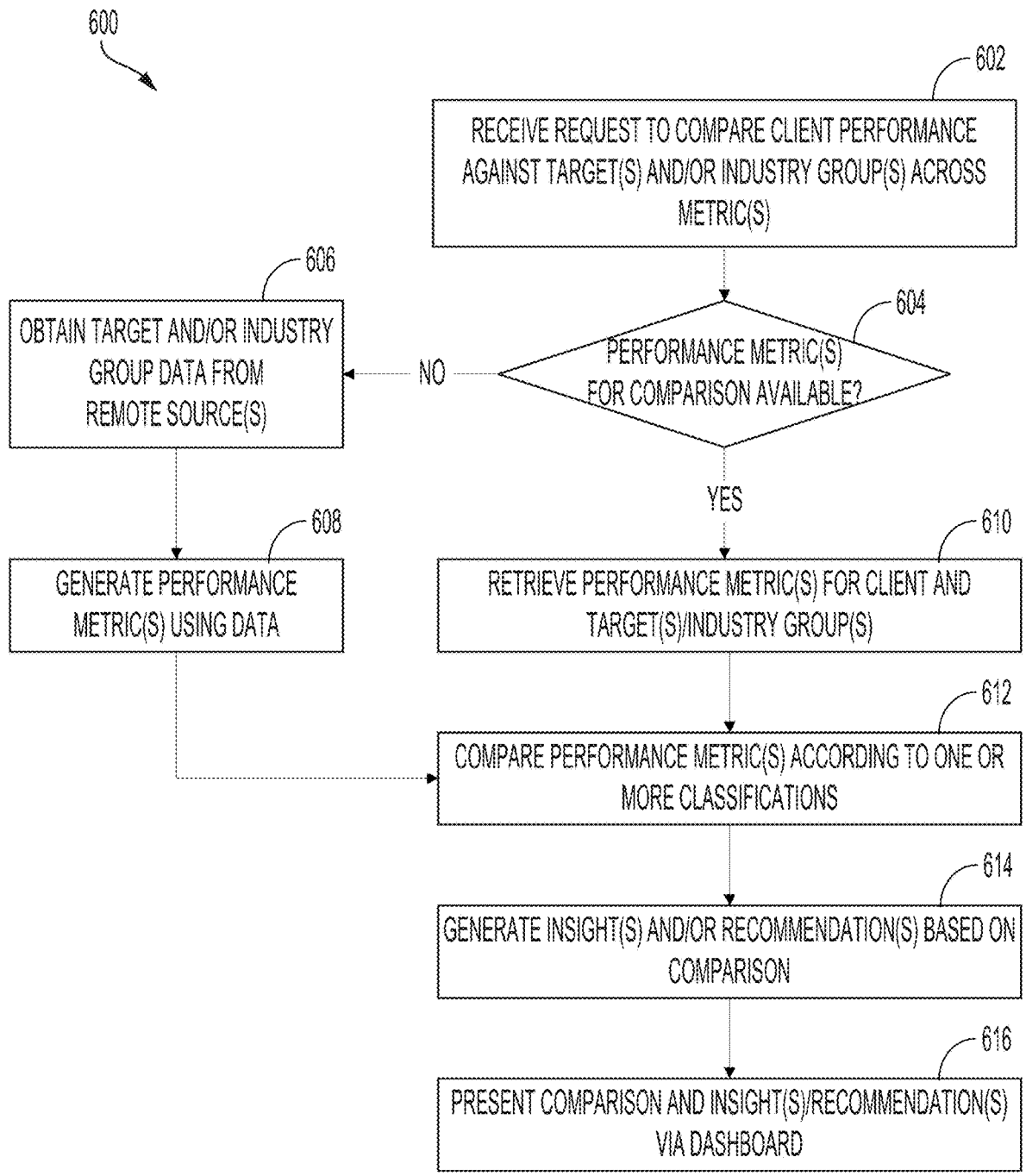
FIG. 6 shows an illustrative example of a process 600 for benchmarking performance of a client by comparing these performance metrics against targets and/or industry groups across various performance metrics in accordance with at least one embodiment.

FIG. 6 shows an illustrative example of a process 600 for benchmarking performance of a client by comparing these performance metrics against targets and/or industry groups across various performance metrics in accordance with at least one embodiment. The process 600 may be performed by the aforementioned performance monitoring system, which may obtain and process performance data corresponding to one or more targets and/or industry groups to provide additional insights and recommendations with regard to the performance of agents associated with a client. At step 602, the performance monitoring system may receive a request from a client to compare client performance against one or more targets and/or industry groups across various performance metrics (e.g., KPIs). For instance, via a dashboard or other interface provided by the performance monitoring system, the client may select one or more targets and/or industry groups for which the client would like to obtain a benchmark for its agents across one or more performance metrics. The one or more targets and/or industry groups may correspond to other clients of the performance monitoring system and to other entities for which performance data may be available via one or more remote sources, as described herein.

At step 604, the performance monitoring system may determine whether the performance metrics for the selected targets and/or industry groups are available within a comparison datastore of the performance monitoring system. For instance, if the selected targets and/or industry groups are clients of the performance monitoring system, the performance monitoring system, at step 610, may obtain the performance metrics for these targets and/or industry groups from the comparison datastore. Alternatively, if the performance metrics for the selected targets and/or industry groups is not available via the comparison datastore, the performance monitoring system, at step 606, may obtain performance data associated with the selected targets and/or industry groups from one or more remote sources. These remote sources may include publications, third-party performance evaluators, or any other source that the performance monitoring system may be subscribed to for obtaining the performance data.

At step 608, the performance monitoring system may generate performance metrics for the selected targets and/or industry groups using the data obtained from the remote sources. For instance, if the obtained performance metrics or other data associated with the one or more targets and/or industry groups are not in a format conducive to providing benchmarking comparisons with performance metrics of a client, the performance monitoring system may process the obtained performance metrics or other data using a performance evaluation sub-system to generate a new set of performance metrics for the one or more targets and/or industry groups that can be used for benchmarking purposes. In some instances, the performance monitoring system may anonymize the performance metrics of the selected targets and/or industry groups to obscure the source of these performance metrics.

At step 612, the performance monitoring system may compare the performance metrics of the client to the performance metrics of the one or more targets and/or industry groups selected by the client according to one or more classifications. The one or more classifications may correspond to particular intents, types of intents, and/or lines of business, and the like. Additionally, at step 614, the performance monitoring system may generate insights and/or recommendations based on the aforementioned comparison of performance metrics. For instance, the performance monitoring system may generate insights related to actions taken by the one or more targets and/or industry groups selected by the client to achieve their corresponding performance metrics along different classifications. For instance, the performance monitoring system may determine, for a particular target, performance metrics for a particular target prior to the performance of one or more actions (e.g., implementing automated capabilities for identifying customer intents, training agents to adhere to recommendations from the agent training system, etc.) and performance metrics for the particular target after performance of the one or more actions. In some instances, the performance monitoring system may generate insights regarding the issues encountered by the one or more targets and/or industry groups, the reasons these issues were encountered, what actions were taken or recommended to address these issues, and the results stemming from performance or omission of these actions.

At step 616, the performance monitoring system may present the comparison and any insights and/or recommendations generated by the performance monitoring system to the client via the dashboard or other interface. For instance, the performance monitoring system may provide a comparison of the client's performance metrics to those of the selected targets and/or industry groups via the dashboard. Similarly, the performance monitoring system may update the dashboard to provide insights into the actions taken by one or more targets and/or industry groups to improve their performance metrics. As noted above, information corresponding to the selected one or more targets and/or industry groups may be anonymized to ensure the privacy of entities from which performance metrics and known actions performed to improve performance metrics were obtained.

Figure 7:
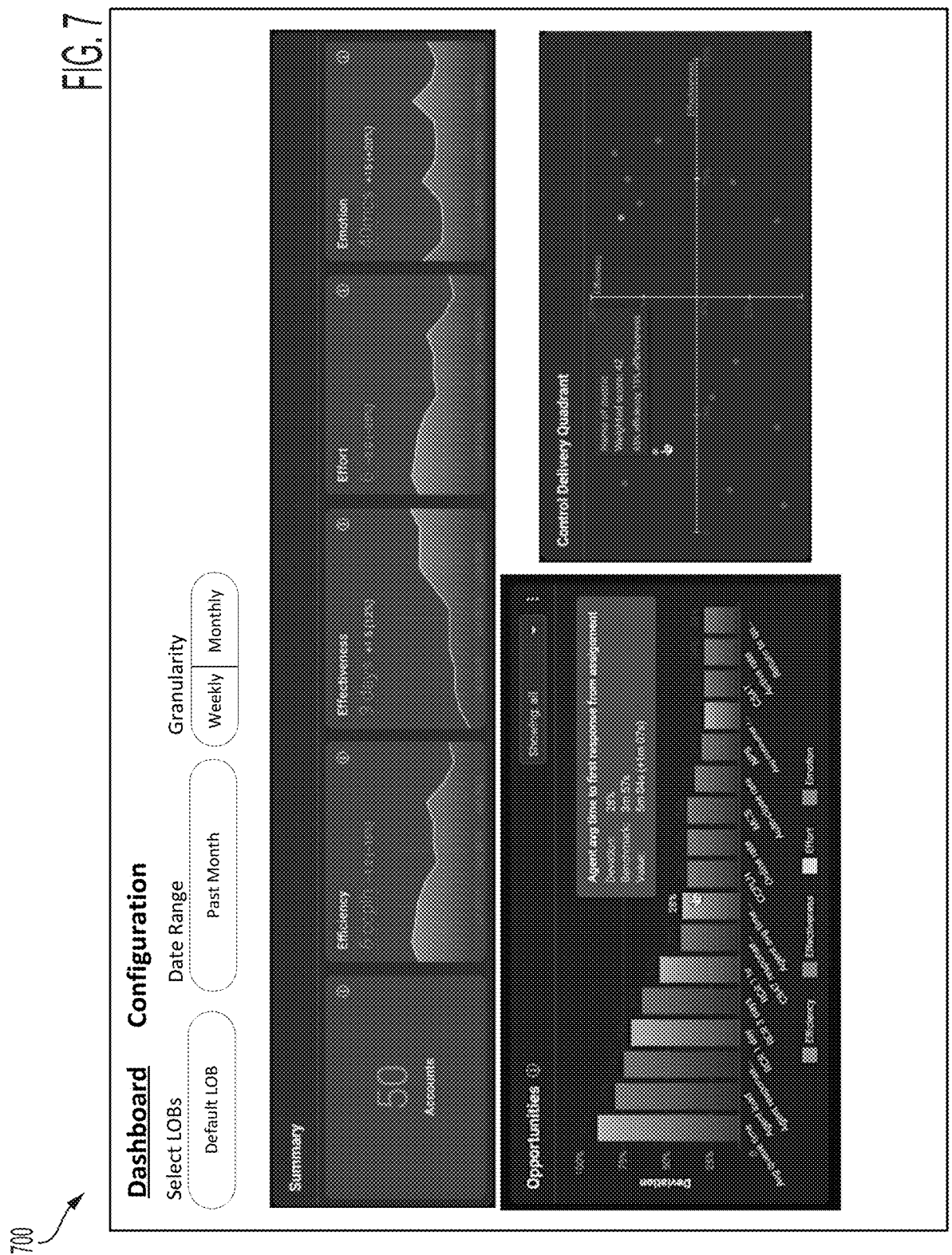
FIG. 7 shows an illustrative example of a user interface for presenting a performance summary for a client based on one or more metrics in accordance with at least one embodiment.

FIG. 7 shows an illustrative example of a user interface 700 for presenting a performance summary for a client based on one or more metrics in accordance with at least one embodiment. Through the user interface 700, a client may be presented with a variety of performance metrics via a set of charts, graphs, or other graphical representations. Additionally, these performance metrics may be categorized based on an operational model. For instance, as illustrated in FIG. 7, the various performance metrics for a client may be categorized as being part of an efficiency pillar, an effectiveness pillar, an effort pillar, and an emotion pillar. It should be noted that the categories presented in FIG. 7 are for illustrative purposes and additional, fewer, or alternative categories may be implemented and presented via the user interface 700.

As illustrated in FIG. 7, the performance monitoring system can provide a client, via the user interface 700, with one or more options to define what data is presented to the client, as well as the level of granularity for presentation of the data. For instance, the performance monitoring system may allow a client, via the user interface 700, to select the line(s) of business for which the client may wish to obtain performance metrics for, select the date range for the data that is to be presented via the user interface 700, and the level of granularity (e.g., weekly or monthly, as illustrated in FIG. 7, or any other granular level) for the data to be presented within the specified date range.

The performance monitoring system may provide a summary of KPIs corresponding to effort, emotion, efficiency, and effectiveness pillars, as well as indicate (via graphs, tables, etc.) any changes to these KPIs over the specified date range indicated by the client. For example, as illustrated in FIG. 7, the performance monitoring system may indicate, for the efficiency pillar, the current closed conversations per login hour (CCPLH) for the selected line of business. Further, the performance monitoring system may indicate any change to the CCPLH over the specified date range to provide the client with an indication of any change to the efficiency of the selected line of business over this specified date range. As another illustrative example, the performance monitoring system may indicate, for the effectiveness pillar, the current repeat contact rate 3-day (RCR 3D) for the selected line of business. The RCR 3D for a line of business may correspond to the percentage of closed conversations where the same customer identifier opened a subsequent conversation between one to three days. Similar to the graphical representation of CCPLH change over the specified date range, the performance monitoring system may indicate any change to the RCR 3D over the specified date range to provide the client with an indication of any change to the effectiveness of the selected line of business in addressing customer intents or issues over this specified date range.

With regard to the effort pillar, the performance monitoring system may indicate the current repeat contact rate 1-hour (RCR 1HR) for the selected line of business. The RCR 1HR for a line of business may correspond to the percentage of closed conversations where the same customer identifier opened a subsequent conversation within an hour. As opposed to the RCR 3D, the RCR 1HR may serve as an indication of agent effort to address a customer's intent or issue in an appropriate manner to produce a positive resolution. As an illustrative example, if an agent closes a conversation with a particular customer with little to no effort placed in resolving the customer's intent or issue, the likelihood of the customer opening a subsequent conversation within a short period of time for the same or similar intent or issue may increase.

The emotion pillar may be represented via the user interface 700 using a Meaningful Conversation Score (MCS), which represents an automated, real-time measurement of customer sentiment for closed conversations, including any unassigned conversations. In some instances, the MCS is attributed only to the last assigned agent in the conversation. In an embodiment, the performance monitoring system utilizes a machine learning algorithm or other artificial intelligence to determine the MCS for agents associated with the selected line of business. For instance, the machine learning algorithm or other artificial intelligence may process conversation data corresponding to conversations between customers and agents to analyze the tone, content, and sentiment of the customers' actual conversations with these agents in real-time. For instance, the machine learning algorithm or other artificial intelligence may utilize natural language processing (NLP) to evaluate conversations in real-time and identify the tone, content, and sentiment behind each message exchanged during these conversations. Each message may be assigned an MCS and the conversation MCS may be determined based on a combination of all message MCSs for the conversation. These scores may be aggregated to form the MCS for the selected line of business, which may be represented via the user interface 700.

In addition to providing performance metrics corresponding to the different performance pillars described above, the performance monitoring system may further provide, via the user interface 700, an opportunities panel. Through the opportunities panel, the performance monitoring system may rank primary and secondary performance metrics across the different performance pillars based on the deviation from industry benchmarks or target value (as defined by the client), and determined by metric configuration (benchmark or numerical target). In some instances, the performance metrics represented in the opportunities panel may be color-coded by their respective performance pillar and then ranked based on which performance metric has the greatest deviation from the selected benchmark or numerical target. This may allow the client to focus on the most impactful performance metric that will improve overall client performance in conversations with customers.

In some instances, the performance monitoring system may allow clients to filter the various performance metrics according to their corresponding performance pillars. For example, the performance monitoring system may provide a filter drop-down menu, which may display a multi-selection option that allows a client to choose the performance pillars to display in the opportunities panel. Further, the performance monitoring system may allow clients to select each individual bar corresponding to a particular performance metric to automatically navigate to that performance metric in a performance pillar detail section of the interface, as described in greater detail herein.

The performance monitoring system may further provide, via the user interface 700, a controlled delivery panel, through which each line of business selected is represented by a dot on a double-axis chart. The chart represented in the controlled delivery panel may compare, for each line of business, the overall scores for efficiency (e.g., performing in the best manner with least waste of resources) and effectiveness (e.g., the ability to achieve the intended result of resolving the customer intent or issue). The overall scores may be determined by a weighted score of all primary and secondary performance metrics within the performance metric categories for efficiency and effectiveness. Through the controlled delivery panel, a client may assess with lines of business to focus on based on the location of these lines of business within the chart. For example, a line of business located in the top-right corner of the chart (e.g., high effectiveness and efficiency) may be highly effective and efficient, whereas a line of business located in the bottom-left corner of the chart may be highly ineffective and inefficient. In some instances, if a client uses a cursor to hover over a particular data point within the chart, the performance monitoring system may present, via the user interface 700, the name of the line of business and the overall performance score for the line of business. Further, selection of a data point within the chart may cause the performance monitoring system to update the user interface 700 to present a performance summary detail panel, as described in greater detail herein.

Figure 8:
FIG. 8 shows an illustrative example of a user interface for presenting calculated scores corresponding to different performance metrics in accordance with at least one embodiment.

FIG. 8 shows an illustrative example of a user interface 800 for presenting calculated scores corresponding to different performance metrics in accordance with at least one embodiment. Through the user interface 800, the performance monitoring system may provide a summary of performance metrics according to each of the performance pillars described above (e.g., efficiency, effectiveness, effort, and emotion). For instance, via the user interface 800, the performance monitoring system may generate a composite performance score for each of the performance pillars to provide clients with a summary with regard to their performance for each of the performance pillars. For each performance pillar, the performance monitoring system may incorporate all primary and secondary performance metrics associated with the performance pillar. Further, the performance monitoring system may weigh each of these performance metrics based on the identified level of impact for each performance metric.

In an embodiment, the performance monitoring system, via the user interface 800, provides a client's performance against industry benchmarks for each of the performance pillars described above. For instance, the performance monitoring system may display industry benchmarks in 25 percentile increments, whereby client performance for each performance pillar may be quantified according to a particular industry benchmark quartile. In some instances, these percentile increments may be color-coded, whereby red may be used to denote quartiles below the $50^{th}$ percentile and green may be used to denote quartiles above the $50^{th}$ percentile. The performance scores for each of the performance pillars may thus be adjusted or scaled according to the industry benchmarks to determine the client's performance against the industry benchmark. As an illustrative example, a client's performance score for the efficiency pillar may be assigned a value of 55% (as illustrated in FIG. 8) which may serve as an indication that the client is performing within the 50-$75^{th}$ percentile (third quartile) within the particular industry.

In addition to providing the performance score for each of the performance pillars, the performance monitoring system may provide any additional insights into the client's performance within each of the performance pillars. As noted above, the performance monitoring system may generate various insights into agent performance that may be used to identify areas of improvement or reinforcement for agents associated with a client. For instance, the performance monitoring system may utilize conversation data, as well as the calculated performance metrics for the agents, to identify these areas of improvement or reinforcement and to provide any valuable insights into the conversational operations of the client. These areas of improvement/reinforcement and insights may be generated according to each of the performance pillars represented in the user interface 800. Thus, the performance monitoring system may qualify the client's performance within the user interface 800 in addition to quantifying, against industry benchmarks, the client's performance along the various performance pillars.

Figure 9:
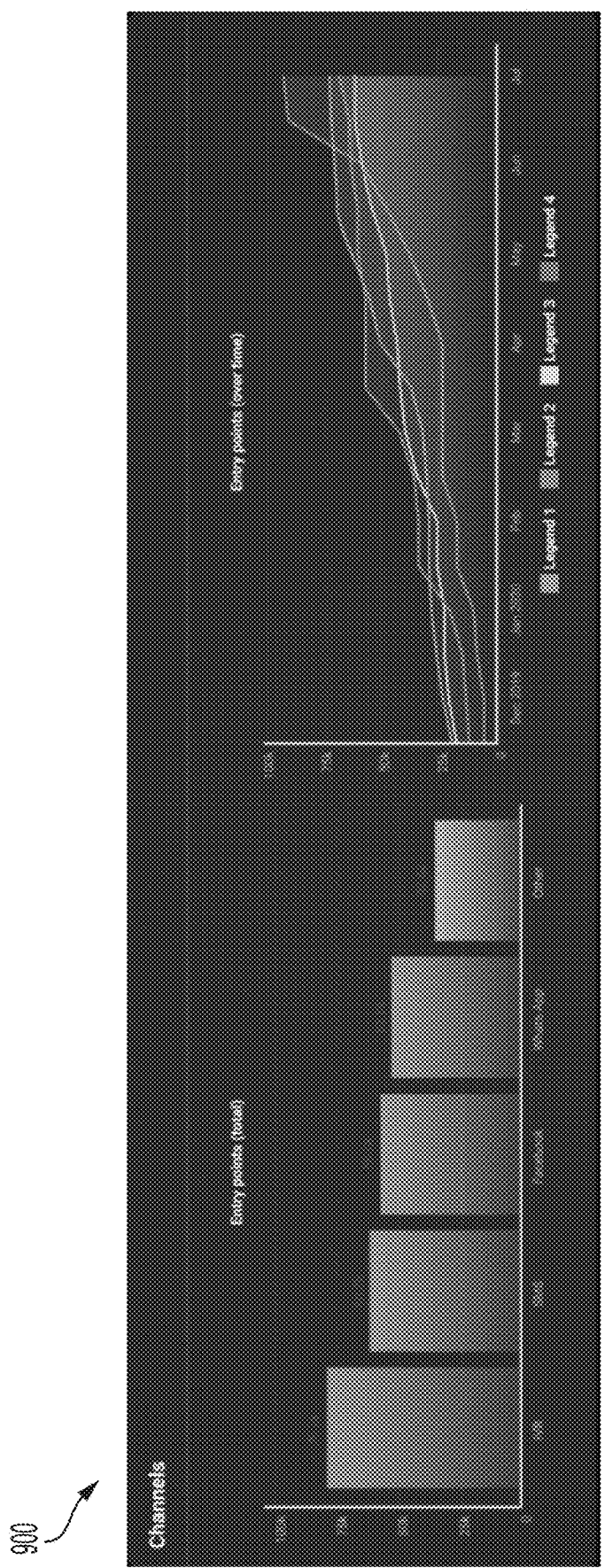
FIG. 9 shows an illustrative example of a user interface for presenting insights into closed conversation volume by possible entry points in accordance with at least one embodiment.

FIG. 9 shows an illustrative example of a user interface 900 for presenting insights into closed conversation volume by possible entry points in accordance with at least one embodiment. The user interface 900 may provide a channel specific view that enables clients to understand activity across the various entry points (e.g., social media platforms, applications across different operating systems, etc.). For instance, as illustrated in FIG. 9, the performance monitoring system may provide a bar chart that displays the distribution of closed conversations across the various entry points utilized by the client for conversations between customers and agents.

In addition to the aforementioned bar chart, the performance monitoring system, via the user interface 900, may present clients with a graphical representation of the volume of closed conversations over time for each of the entry points. For instance, as illustrated in FIG. 9, the performance monitoring system may generate a line chart that displays entry point volume over time according to each possible entry point utilized by the client.

Figure 10:
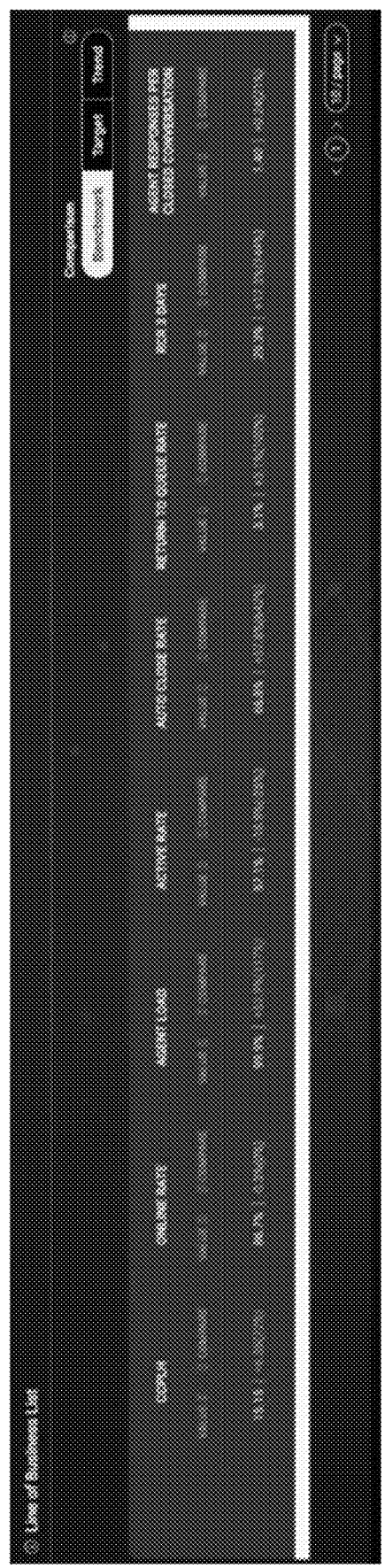
FIG. 10 shows an illustrative example of a user interface for presenting various performance metrics for a particular line of business in accordance with at least one embodiment.

FIG. 10 shows an illustrative example of a user interface 1000 for presenting various performance metrics for a particular line of business in accordance with at least one embodiment. The performance monitoring system may display, via the user interface 1000, various performance metrics corresponding to the aforementioned performance pillars. For instance, the performance monitoring system may provide the primary and secondary performance metrics corresponding to the efficiency, effectiveness, effort, and emotion pillars. In some instances, the performance monitoring system may provide clients, via the user interface 1000, with one or more options to filter the provided performance metrics. For instance, a client may select to display performance metrics tied to a particular performance pillar. Alternatively, the client may select particular performance metrics that are to be displayed via the user interface 1000.

In an embodiment, the performance monitoring system can provide data corresponding to the performance of specific client lines of business against various benchmarks (e.g., performance against industry benchmarks), targets (e.g., target values, if defined by the client), and trends (e.g., upward or downward trends). A client, via the user interface 1000, may toggle selections corresponding the various options for displaying performance metrics against benchmarks, targets, and/or trends. In some instances, the performance monitoring system may provide various default options for presentation of the performance metrics for a particular line of business. For example, the performance monitoring system may provide benchmark, actual, trend, and deviation values for each performance metric based on the filtered date range entered by the client (e.g., the date range defined and illustrated in FIG. 7, etc.).

Figure 11:
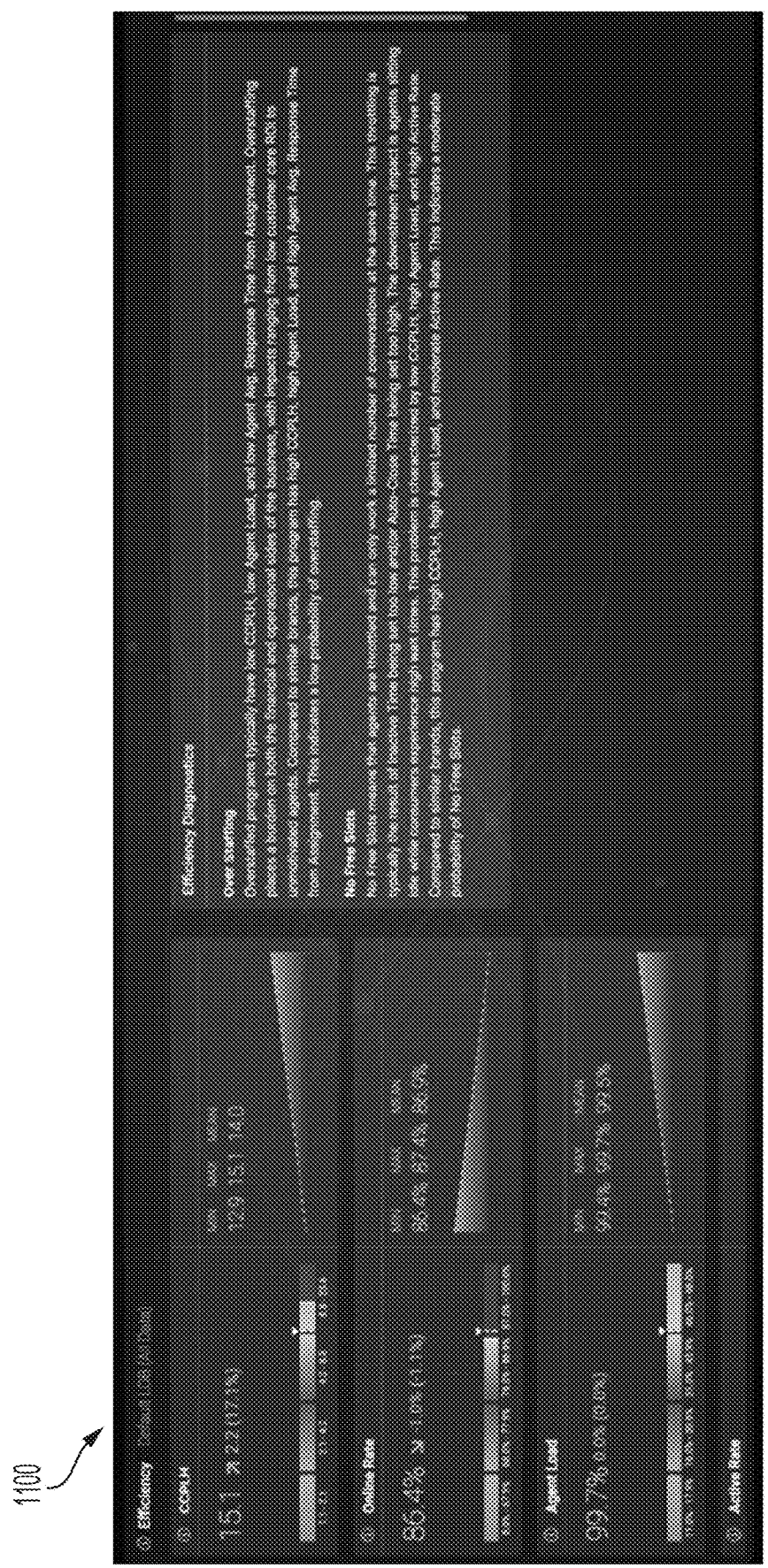
FIG. 11 shows an illustrative example of a user interface for providing information usable to compare key performance indicators (KPIs) against industry benchmarks in accordance with at least one embodiment.

FIG. 11 shows an illustrative example of a user interface 1100 for providing information usable to compare KPIs against industry benchmarks in accordance with at least one embodiment. The performance monitoring system, via the user interface 1100, may provide a vast amount of information to the client to allow the client to compare performance metrics for each of the performance pillars described above. Through the user interface 1100, the client may compare primary and secondary performance metrics for each of these performance pillars against industry benchmarks and/or targets. For example, as illustrated in FIG. 11, the client may be presented with their actual performance metric values for each performance pillar (presented using white numerical values), with how the client has trended compared to the industry benchmark (e.g., smaller value with upward or downward trend indicator), as well as the variance of their performance (represented via percentage, indicating the gap between what was expected and what occurred) against the industry benchmark. Additionally, the client may be presented, via the user interface 1100, with a detailed trend line for each performance metric, as well as a minimum, maximum, and mean value for their performance according to the corresponding performance metric.

In an embodiment, the performance monitoring system further provides, via the user interface 1100, a diagnostics section. The diagnostics section of the user interface 1100 may provide a detailed narrative of the performance of the client's lines of business. As noted above, the performance monitoring system may use a machine learning algorithm or artificial intelligence to automatically provide an assessment of the client's conversational operations, which may lead to data-drive decision-making for improvement of agent performance. For example, the performance monitoring system may provide metrics and characteristics corresponding to conversations between agents and customers (e.g., conversation topics or intents, customer surveys or feedback, messaging rate metrics, agent availability metrics, metrics associated with the usage of automated tools or capabilities, etc.), actual conversation transcripts, and the like as input to the machine learning algorithm or artificial intelligence to obtain an assessment of client performance and to identify possible solutions or recommendations for improvement. The output of the machine learning algorithm or artificial intelligence may provide a description of what has occurred or is occurring amongst the client's lines of business that has resulted in the current level of performance. Further, the output of the machine learning algorithm or artificial intelligence may provide diagnostic information corresponding to rationales as to what has occurred or is occurring.

The performance monitoring system, via the diagnostics section of the user interface 1100, may contextualize the client's performance metric data according to the various performance pillars and the account configuration settings selected by the client to provide an automated and customized recommendation for the client to improve performance based on the line of business and date range selected. In some instances, the performance monitoring system may provide diagnostic playbooks or other resources that include operational procedures that may be performed to improve client performance.

Figure 12:
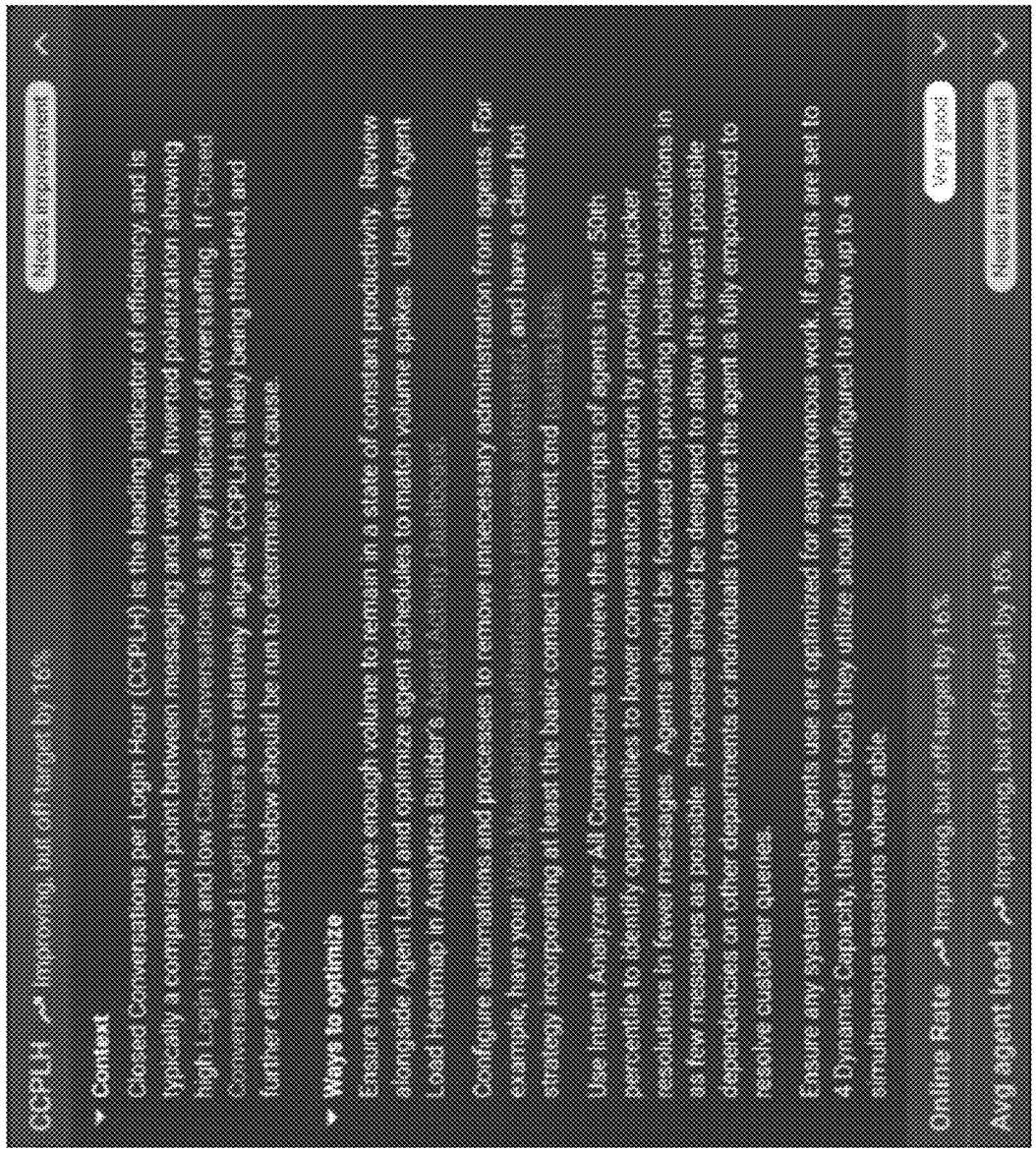
FIG. 12 shows an illustrative example of a user interface for presenting recommendations and insights for improving one or more performance metrics in accordance with at least one embodiment.

FIG. 12 shows an illustrative example of a user interface 1200 for presenting recommendations and insights for improving one or more performance metrics in accordance with at least one embodiment. The user interface 1200 may be accessed via client interaction with the user interface 1100 described above. For instance, in an embodiment, the performance monitoring system can provide, via the diagnostics section of the user interface 1100, an indication as to whether a particular performance metric may require improvement (e.g., performance metric fails to satisfy an acceptable threshold value), is within acceptable parameters (e.g., performance metric is within a range deemed to correspond to an acceptable state), or is deemed to be in a preferable state (e.g., performance metric is within a range deemed to correspond to a preferable state). Additionally, the performance monitoring system may provide a header for each performance metric that may correspond to recommendations and insights for improvement of the performance metric.

In an embodiment, selection of the header causes the performance monitoring system to provide the user interface 1200 for the selected performance metric. For example, as illustrated in FIG. 12, the user interface 1200 may correspond to the CCPLH performance metric for the lines of business selected by the client. Through the user interface 1200, the performance monitoring system may provide context with regard to the selected performance metric. For instance, the performance monitoring system may provide a definition for the selected performance metric and may provide insights into how the performance metric may affect the client's overall performance.

Further, the performance monitoring system may provide one or more recommendations for improving metric performance. For example, as illustrated in FIG. 12 for the CCPLH metric, the performance monitoring system may indicate that the client should ensure that agents have enough volume to remain in a state of constant productivity, configure automations and processes to remove unnecessary administration from agents, review conversation transcripts of higher performing agents to identify opportunities for improvement, and ensure that any system tools agents use are optimized for asynchronous work. In addition to these recommendations, the performance monitoring system may provide additional insights with regard to these recommendations. For example, as illustrated in FIG. 12, the performance monitoring system may indicate that agents should be focused on providing holistic resolutions in as few messages as possible and that processes should be designed to allow the fewest possible dependencies on other departments or individuals in order to fully empower agents to resolve customer queries. Thus, the performance monitoring system may provide reinforcement with regard to the provided recommendations to incentivize adherence to these recommendations.

As noted above, based on the insights and recommendations provided by the performance monitoring system and presented via the user interface 1200, the client may request that the provided insights and recommendations be used by the agent training system to define a sequence of actions that are performed to accurately capture critical elements expressed by customers in conversations with agents and to identify how best to respond to customers adequately. Based on the insights and recommendations provided by the performance monitoring system, the agent training system may identify what actions may be taken to address these elements in order to enable agents to fulfill customer intents and expectations according to the generated insights and recommendations.

Figure 13:
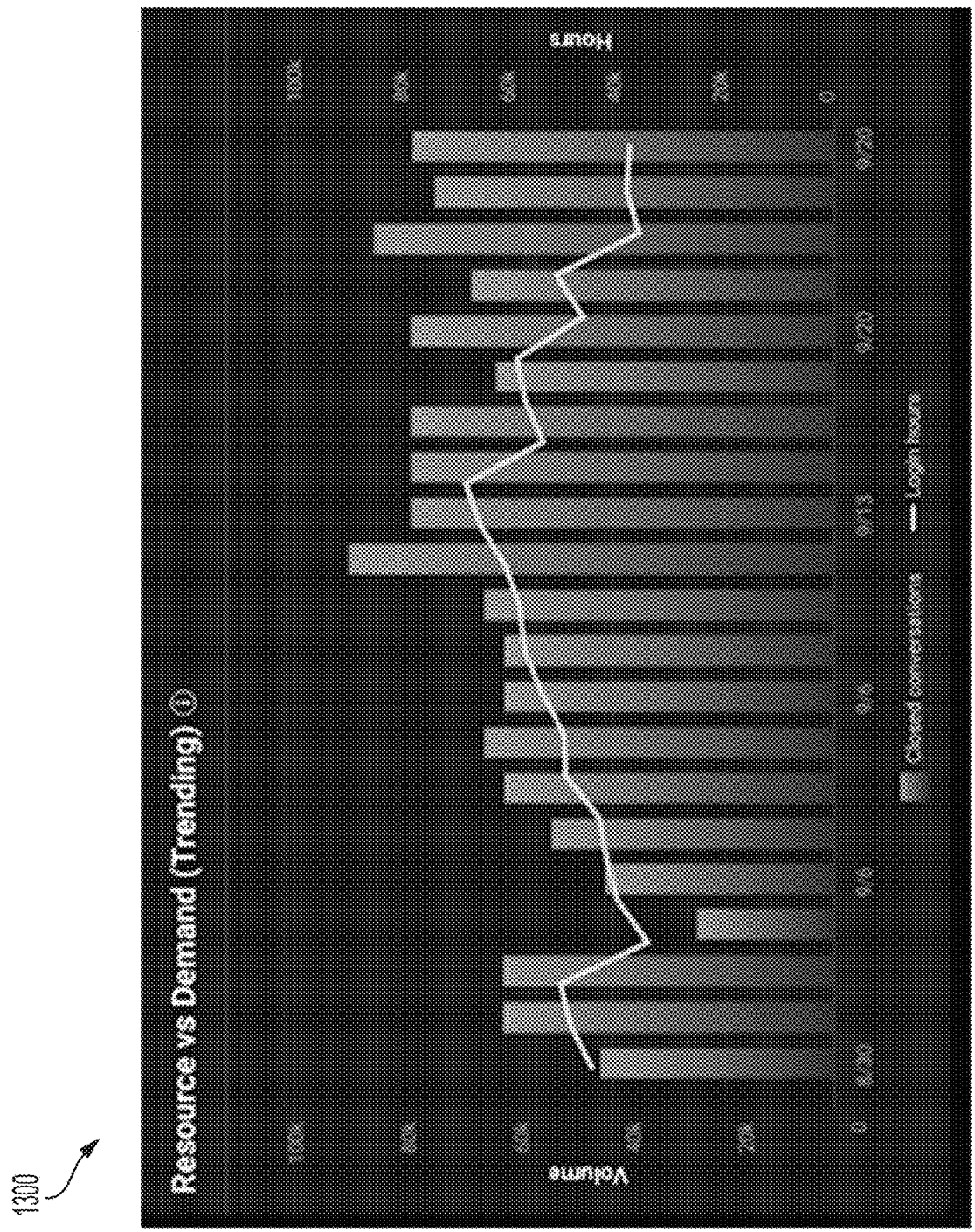
FIG. 13 shows an illustrative example of a user interface for presenting data corresponding to closed conversations and agent login hours over a specified date range in accordance with at least one embodiment.

FIG. 13 shows an illustrative example of a user interface 1300 for presenting data corresponding to closed conversations and agent login hours over a specified date range in accordance with at least one embodiment. The performance monitoring system, via the user interface 1300, may present trends related to the available client resources (e.g., agent availability, etc.) and the demand on the client (e.g., volume of closed conversations, etc.). Through the user interface 1300, a client may view the volume of closed conversations (e.g., by agent, customer, or automatic closure) and agent login hours over a date range specified by the client (such as through the user interface 700 described above). The correlation between the volume of closed conversations with the agent login hours over the same time span may be used by a client to optimize their agent staffing and/or implement automated tools (e.g., bots, etc.) for addressing spikes in demand over time.

Figure 14:
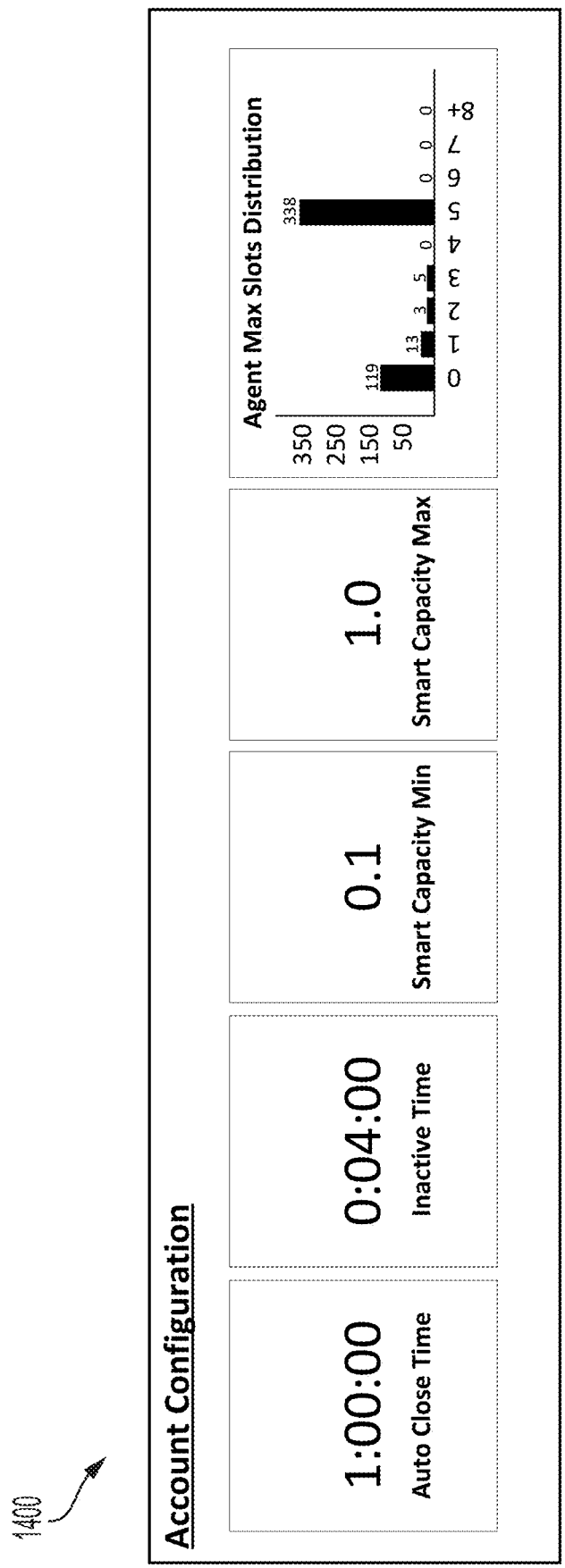
FIG. 14 shows an illustrative example of a user interface for displaying configuration settings that may drive client performance in accordance with at least one embodiment.

FIG. 14 shows an illustrative example of a user interface 1400 for displaying configuration settings that may drive client performance in accordance with at least one embodiment. As illustrated in FIG. 14, the account configurations may include an automatic close time, an inactive time, a smart capacity minimum, and a smart capacity maximum. The values for each of these settings may be defined by the client via the user interface 1400. These settings may be used to determine the impact of agent performance with regard to each of the performance pillars. For instance, the setting for automatic close time may potentially affect the performance metrics associated with the effort pillar measured in conversations. In addition to these account configurations, the performance monitoring system can provide a chart or other graphical representation of the distribution of agent maximum slots.

Figure 15:
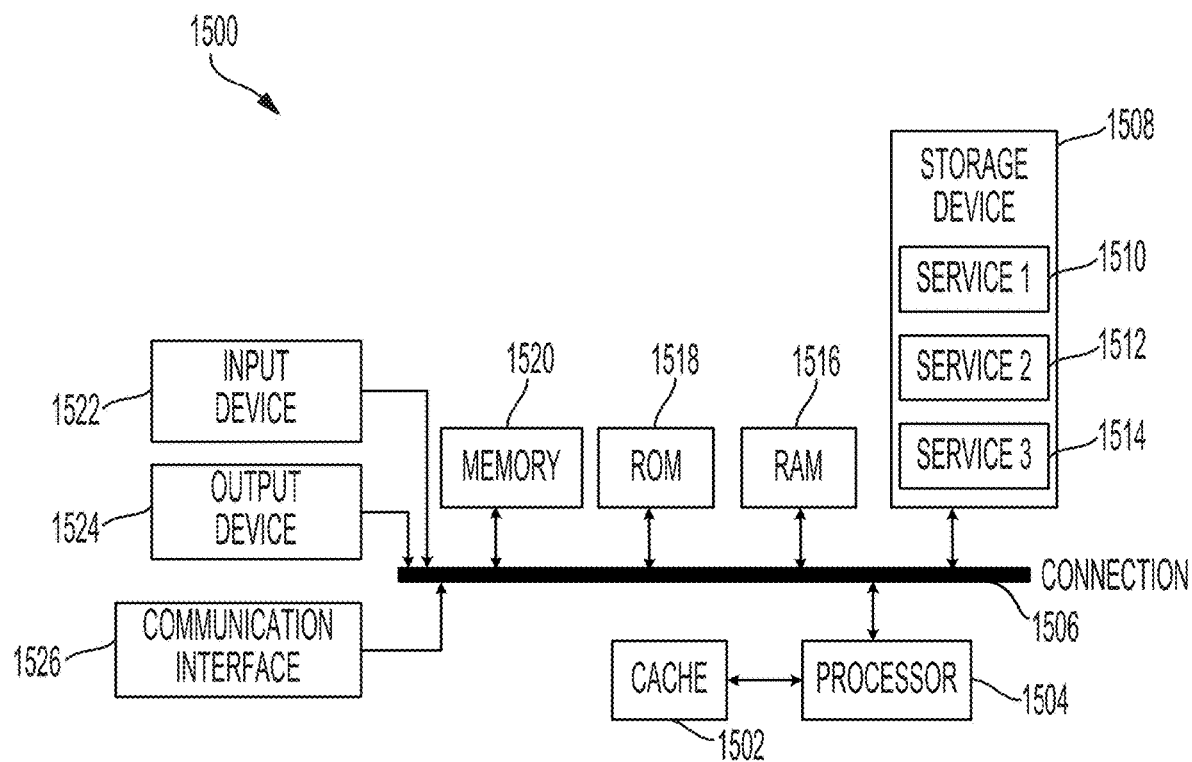
FIG. 15 shows an illustrative example of a computing system architecture including various components in electrical communication with each other using a connection, such as a bus, in accordance with various embodiments.

FIG. 15 illustrates a computing system architecture 1500 including various components in electrical communication with each other using a connection 1506, such as a bus, in accordance with some implementations. Example system architecture 1500 includes a processing unit (CPU or processor) 1504 and a system connection 1506 that couples various system components including the system memory 1520, such as ROM 1518 and RAM 1516, to the processor 1504. The system architecture 1500 can include a cache 1502 of high-speed memory connected directly with, in close proximity to, or integrated as part of the processor 1504. The system architecture 1500 can copy data from the memory 1520 and/or the storage device 1508 to the cache 1502 for quick access by the processor 1504. In this way, the cache can provide a performance boost that avoids processor 1504 delays while waiting for data. These and other modules can control or be configured to control the processor 1504 to perform various actions.

Other system memory 1520 may be available for use as well. The memory 1520 can include multiple different types of memory with different performance characteristics. The processor 1504 can include any general purpose processor and a hardware or software service, such as service 1 1510, service 2 1512, and service 3 1514 stored in storage device 1508, configured to control the processor 1504 as well as a special-purpose processor where software instructions are incorporated into the actual processor design. The processor 1504 may be a completely self-contained computing system, containing multiple cores or processors, a bus, memory controller, cache, etc. A multi-core processor may be symmetric or asymmetric.

To enable user interaction with the computing system architecture 1500, an input device 1522 can represent any number of input mechanisms, such as a microphone for speech, a touch-sensitive screen for gesture or graphical input, keyboard, mouse, motion input, speech and so forth. An output device 1524 can also be one or more of a number of output mechanisms known to those of skill in the art. In some instances, multimodal systems can enable a user to provide multiple types of input to communicate with the computing system architecture 1500. The communications interface 1526 can generally govern and manage the user input and system output. There is no restriction on operating on any particular hardware arrangement and therefore the basic features here may easily be substituted for improved hardware or firmware arrangements as they are developed.

Storage device 1508 is a non-volatile memory and can be a hard disk or other types of computer readable media which can store data that are accessible by a computer, such as magnetic cassettes, flash memory cards, solid state memory devices, digital versatile disks, cartridges, RAMs 1516, ROM 1518, and hybrids thereof.

The storage device 1508 can include services 1510, 1512, 1514 for controlling the processor 1504. Other hardware or software modules are contemplated. The storage device 1508 can be connected to the system connection 1506. In one aspect, a hardware module that performs a particular function can include the software component stored in a computer-readable medium in connection with the necessary hardware components, such as the processor 1504, connection 1506, output device 1524, and so forth, to carry out the function.

Figure 16:
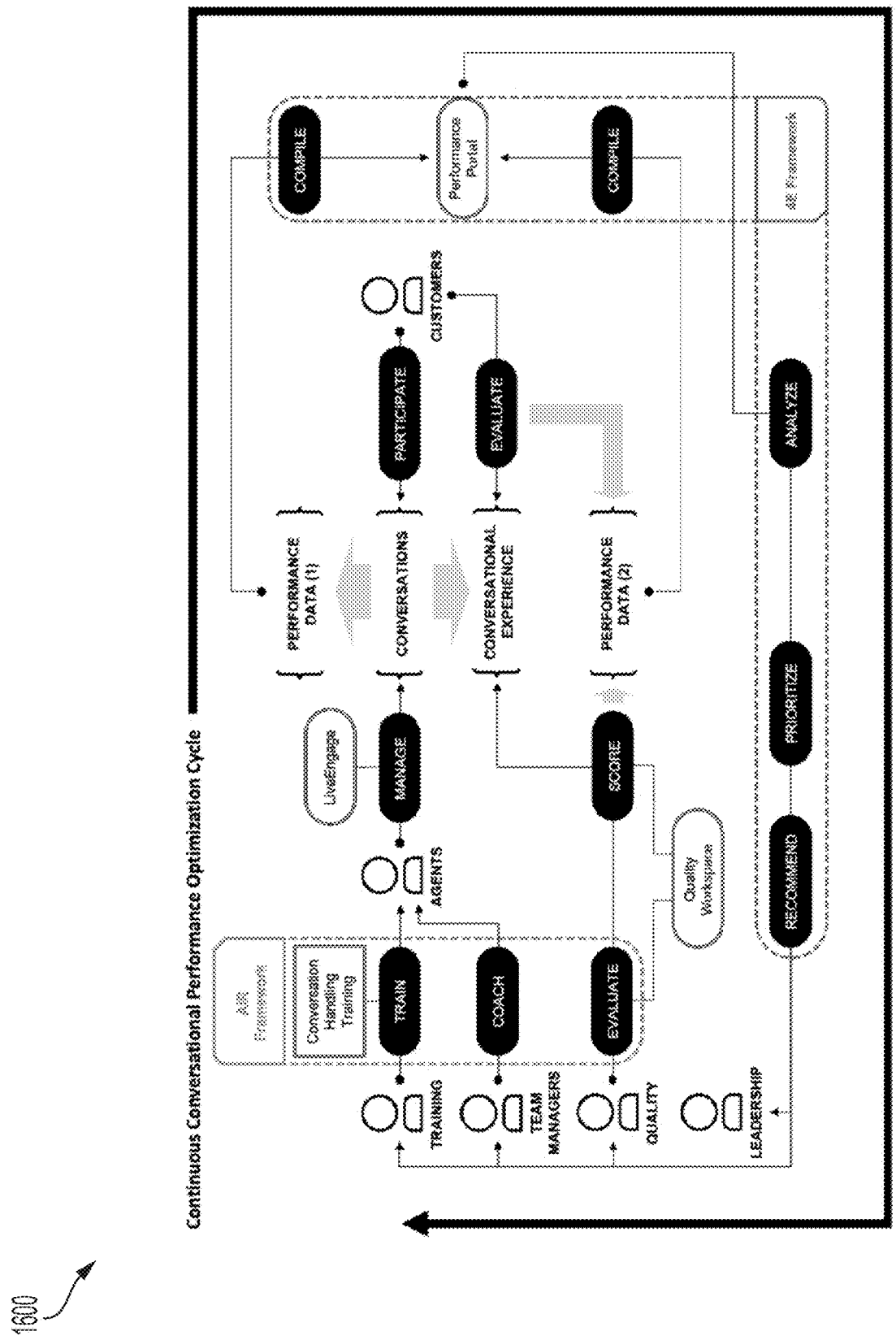
FIG. 16 shows an illustrative example of an environment in which various embodiments can be implemented.

FIG. 16 shows an illustrative example of an environment 1600 in which various embodiments can be implemented. In the environment 1600, an analyze-identify-respond (AIR) framework is presented that incorporates the intent processing system and performance monitoring system described above in connection with FIGS. 1 and 2. Through the AIR framework, responses to customer intents may be generated and the performance of agents responding to customer intents may be evaluated to determine their efficacy in providing a positive customer experience. As noted above, the performance monitoring system may provide different entities within a customer service call center (e.g., trainers, team managers, quality assurance teams, leadership personnel, etc.) with feedback regarding agent performance, which may allow these entities to coach agents on how best to respond to customers or to perform other remedial tasks.

The evaluations performed via the AIR framework may be used to generate a set of metrics and other performance data for the client, which can be compiled within a 4E (Effectiveness, Effort, Emotion, and Efficiency) framework. Through the 4E framework, a client may be presented with a user interface, such as those described above in connection with FIGS. 7-14, through which the client may obtain these various metrics and other performance data for the client and for other clients. This allows the client to determine how its agents, in aggregate, are performing and compare their performance to the performance of other clients. This may help the client to define possible avenues for improvement.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
    obtaining conversation data, wherein the conversation data corresponds to one or more conversations between customers and agents of a client, and wherein the one or more conversations correspond to a set of intents;
    identifying explicit elements and implied elements of the set of intents;
    determining a set of contexts from the set of intents, wherein the set of contexts are determined based on the explicit elements, the implied elements, and the one or more conversations between the customers and the agents;
    training a machine learning algorithm, wherein the machine learning algorithm is trained using the set of contexts, the explicit elements, the implied elements, and the one or more conversations between the customers and the agents, and wherein the machine learning algorithm is trained to generate a set of actions performable to improve agent responses to new intents;
    receiving new conversation data corresponding to new conversations;
    identifying actions performable to improve agent responses to new intents associated with the new conversations, wherein the actions are identified using the new conversation data and the machine learning algorithm;
    generating one or more recommendations corresponding to the actions, wherein the one or more recommendations are presented to address the new intents associated with the new conversations; and
    dynamically monitoring adherence to the one or more recommendations in real-time.

2. The computer-implemented method of claim 1, wherein the one or more recommendations include conditional logic, wherein the conditional logic is executable to contextualize new explicit elements and new implied elements for addressing the new intents associated with the new conversations.

3. The computer-implemented method of claim 1, wherein dynamically monitoring the adherence to the one or more recommendations includes processing a data stream of a new conversation between a customer and an agent, wherein the data stream is processed in real-time during the new conversation, and wherein the agent responses from the data stream are evaluated in real-time to determine whether the agent is adhering to the one or more recommendations.

4. The computer-implemented method of claim 1, wherein dynamically monitoring the adherence to the one or more recommendations includes providing feedback to the agents, wherein the feedback is provided based on an evaluation of agent responses according to the one or more recommendations.

5. The computer-implemented method of claim 1, wherein dynamically monitoring the adherence to the one or more recommendations includes determining a sentiment from a new conversation, wherein the sentiment is evaluated to determine whether agent responses in the new conversation adhere to the one or more recommendations.

6. The computer-implemented method of claim 1, further comprising generating a set of performance metrics corresponding to the agents, wherein the set of performance metrics correspond to performance of the agents in addressing the set of intents and sentiments of the customers.

7. The computer-implemented method of claim 1, further comprising obtaining feedback corresponding to the conversations, wherein the feedback is processed to identify the set of actions performable to improve the agent responses to the new intents.

8. The computer-implemented method of claim 1, further comprising using a new set of contexts, new explicit elements, new implied elements, the new conversations, and data corresponding to the adherence to the one or more recommendations to further train the machine learning algorithm.

9. A system, comprising:
    one or more processors; and
    memory storing thereon instructions that, as a result of being executed by the one or more processors, cause the system to:
        obtain conversation data, wherein the conversation data corresponds to one or more conversations between customers and agents of a client, and wherein the one or more conversations correspond to a set of intents;
        identify explicit elements and implied elements of the set of intents;
        determine a set of contexts from the set of intents, wherein the set of contexts are determined based on the explicit elements, the implied elements, and the one or more conversations between the customers and the agents;
        train a machine learning algorithm, wherein the machine learning algorithm is trained using the set of contexts, the explicit elements, the implied elements, and the one or more conversations between the customers and the agents, and wherein the machine learning algorithm is trained to generate a set of actions performable to improve agent responses to new intents;

receive new conversation data corresponding to new conversations;

identify actions performable to improve agent responses to new intents associated with the new conversations, wherein the actions are identified using the new conversation data and the machine learning algorithm;

generate one or more recommendations corresponding to the actions, wherein the one or more recommendations are presented to address the new intents associated with the new conversations; and dynamically monitor adherence to the one or more recommendations in real-time.

10. The system of claim 9, wherein the one or more recommendations include conditional logic, wherein the conditional logic is executable to contextualize new explicit elements and new implied elements for addressing the new intents associated with the new conversations.

11. The system of claim 9, wherein the instructions that cause the system to dynamically monitor the adherence to the one or more recommendations further cause the system to process a data stream of a new conversation between a customer and an agent, wherein the data stream is processed in real-time during the new conversation, and wherein the agent responses from the data stream are evaluated in real-time to determine whether the agent is adhering to the one or more recommendations.

12. The system of claim 9, wherein the instructions that cause the system to dynamically monitor the adherence to the one or more recommendations further cause the system to provide feedback to the agents, wherein the feedback is provided based on an evaluation of agent responses according to the one or more recommendations.

13. The system of claim 9, the instructions that cause the system to dynamically monitor the adherence to the one or more recommendations further cause the system to determine a sentiment from a new conversation, wherein the sentiment is evaluated to determine whether agent responses in the new conversation adhere to the one or more recommendations.

14. The system of claim 9, wherein the instructions further cause the system to generate a set of performance metrics corresponding to the agents, wherein the set of performance metrics correspond to performance of the agents in addressing the set of intents and sentiments of the customers.

15. The system of claim 9, wherein the instructions further cause the system to obtain feedback corresponding to the conversations, wherein the feedback is processed to identify the set of actions performable to improve the agent responses to the new intents.

16. The system of claim 9, wherein the instructions further cause the system to use a new set of contexts, new explicit elements, new implied elements, the new conversations, and data corresponding to the adherence to the one or more recommendations to further train the machine learning algorithm.

17. A non-transitory computer-readable storage medium, storing thereon executable instructions that, as a result of being executed by one or more processors of a computer system, cause the computer system to:

obtain conversation data, wherein the conversation data corresponds to one or more conversations between customers and agents of a client, and wherein the one or more conversations correspond to a set of intents;

identify explicit elements and implied elements of the set of intents;

determine a set of contexts from the set of intents, wherein the set of contexts are determined based on the explicit elements, the implied elements, and the one or more conversations between the customers and the agents;

train a machine learning algorithm, wherein the machine learning algorithm is trained using the set of contexts, the explicit elements, the implied elements, and the one or more conversations between the customers and the agents, and wherein the machine learning algorithm is trained to generate a set of actions performable to improve agent responses to new intents;

receive new conversation data corresponding to new conversations;

identify actions performable to improve agent responses to new intents associated with the new conversations, wherein the actions are identified using the new conversation data and the machine learning algorithm;

generate one or more recommendations corresponding to the actions, wherein the one or more recommendations are presented to address the new intents associated with the new conversations; and dynamically monitor adherence to the one or more recommendations in real-time.

18. The non-transitory computer-readable storage medium of claim 17, wherein the one or more recommendations include conditional logic, wherein the conditional logic is executable to contextualize new explicit elements and new implied elements for addressing the new intents associated with the new conversations.

19. The non-transitory computer-readable storage medium of claim 17, wherein the executable instructions that cause the computer system to dynamically monitor the adherence to the one or more recommendations further cause the computer system to process a data stream of a new conversation between a customer and an agent, wherein the data stream is processed in real-time during the new conversation, and wherein the agent responses from the data stream are evaluated in real-time to determine whether the agent is adhering to the one or more recommendations.

20. The non-transitory computer-readable storage medium of claim 17, wherein the executable instructions that cause the computer system to dynamically monitor the adherence to the one or more recommendations further cause the computer system to provide feedback to the agents, wherein the feedback is provided based on an evaluation of agent responses according to the one or more recommendations.

21. The non-transitory computer-readable storage medium of claim 17, wherein the executable instructions that cause the computer system to dynamically monitor the adherence to the one or more recommendations further cause the computer system to determine a sentiment from a new conversation, wherein the sentiment is evaluated to determine whether agent responses in the new conversation adhere to the one or more recommendations.

22. The non-transitory computer-readable storage medium of claim 17, wherein the executable instructions further cause the computer system to generate a set of performance metrics corresponding to the agents, wherein the set of performance metrics correspond to performance of the agents in addressing the set of intents and sentiments of the customers.

23. The non-transitory computer-readable storage medium of claim 17, wherein the executable instructions further cause the computer system to obtain feedback corresponding to the conversations, wherein the feedback is processed to identify the set of actions performable to improve the agent responses to the new intents.

24. The non-transitory computer-readable storage medium of claim 17, wherein the executable instructions further cause the computer system to use a new set of contexts, new explicit elements, new implied elements, the new conversations, and data corresponding to the adherence to the one or more recommendations to further train the machine learning algorithm.

* * * * *